US012793567B2

(12) United States Patent
Alioto et al.

(10) Patent No.: US 12,793,567 B2
(45) Date of Patent: Nov. 10, 2026

(54) SYSTEMS AND METHODS FOR MANAGING EXPERIENTIAL COURSE CONTENT

(71) Applicant: Pearson Education, Inc., Bloomington, MN (US)

(72) Inventors: Franklin Alioto, San Rafael, CA (US); Brian Weck, Sydney (AU); Zack Belinson, Malabar (AU); David Copeman, Surry Hills (AU); David Rowe, Sydney (AU); Amanda Newlin, San Francisco, CA (US); Jeffrey Argast, Palo Alto, CA (US); Kristin Sardina, Corte Madera, CA (US)

(73) Assignee: PEARSON EDUCATION, INC., Bloomington, MN (US)

( * ) Notice: Subject to any disclaimer, the term of this patent is extended or adjusted under 35 U.S.C. 154(b) by 598 days.

(21) Appl. No.: 17/554,191

(22) Filed: Dec. 17, 2021

(65) Prior Publication Data

US 2023/0196935 A1 Jun. 22, 2023

(51) Int. Cl.

| | |
|---|---|
| ***G09B 5/12*** | (2006.01) |
| ***G06F 3/04815*** | (2022.01) |
| ***G09B 9/00*** | (2006.01) |
| ***H04L 67/306*** | (2022.01) |

(52) U.S. Cl.
CPC ........... *G09B 5/12* (2013.01); *G06F 3/04815* (2013.01); *G09B 9/00* (2013.01); *H04L 67/306* (2013.01)

(58) Field of Classification Search
CPC ......... G09B 5/12; G09B 9/00; G06F 3/04815; H04L 67/306
See application file for complete search history.

(56) References Cited

U.S. PATENT DOCUMENTS

| | | | | |
|---|---|---|---|---|
| 11,756,445 B2 * | 9/2023 | Harris | .................... | G06Q 50/20 434/362 |
| 2011/0039249 A1 * | 2/2011 | Packard | .................... | G09B 7/06 434/362 |
| 2014/0220535 A1 * | 8/2014 | Angelone | ................ | G09B 5/00 434/350 |
| 2018/0018892 A1 * | 1/2018 | Di Geronimo | ...... | G09B 19/025 |
| 2019/0318659 A1 * | 10/2019 | Hamadani | ............... | G06F 3/011 |

* cited by examiner

*Primary Examiner* — Timothy A Musselman
(74) *Attorney, Agent, or Firm* — Quarles & Brady LLP

(57) ABSTRACT

Systems and methods of the present invention provide for a database configured to store multiple portions of experiential course content that correspond to an experiential course; a set of candidate screens apportioned accordingly, and a graphical user interface (GUI) configured to elicit, from a user, a selection of a particular set of screens from a user. The systems and methods further provide for receiving, via the GUI, a set of parameters defining a set of pathways, the set of pathways configured to route a learner user through the experiential course. The experiential course content may then be transmitted to the learner user via a GUI configured to route the learner user through the experiential course.

19 Claims, 14 Drawing Sheets

800

900

1000

1200

SYSTEMS AND METHODS FOR MANAGING EXPERIENTIAL COURSE CONTENT

TECHNICAL FIELD

This disclosure relates to the field of systems and methods configured to manage experiential course content to maximize learning potential.

SUMMARY

The disclosed technology relates to systems and methods including one or more server hardware computing devices or client hardware computing devices, communicatively coupled to a network, and each including at least one processor executing specific computer-executable instructions within a memory that, when executed, cause the system to access a database to obtain candidate screen data and present the candidate screen data on a graphical user interface (GUI). In some examples, the server may receive, from a client device via the GUI, user selection for building an experiential course. In an example, an experiential course may generally refer to a course in which course content of the course is configured to provide a learner user (e.g., a student) opportunity to engage or interact with the content of the experiential course or at least a portion of the content (e.g., an experiment section of the course, a data collection section of the course, etc.). Accordingly, the course content may simulate a specific setting for the course in which a learner user may acquire practical experience in a particular area through the experiential course.

The experiential course includes experiential course content that a learner user can navigate through to progress through the experiential course content of the experiential course. In an example, the candidate screen data may include: (i) a set of candidate introduction screens, (ii) a set of candidate pre-lab screens, (iii) a set of candidate lab screens (e.g., lab experiment screens, etc.), and (iv) a set of candidate post-lab screens. In some examples, the server (e.g., the at least one processor of the server) is configured to: provide, to a user device of a content creator, graphical user interface (GUI) data for displaying a GUI on the user device, the GUI data including the candidate screen data. The server(s) can be configured to receive, from the user device via the GUI, user selection of: a subset of introduction screens selected from the candidate introduction screens, the subset of introduction screens forming an introduction portion of an experiential course content, a subset of pre-lab screens selected from the candidate pre-lab screens, the subset of pre-lab screens forming a pre-lab portion of the experiential course content, a subset of lab experiment screens selected from the candidate lab experiment screens, the subset of lab experiment screens forming a lab portion of the experiential course content, and a subset of post-lab screens selected from the candidate post-lab screens, the subset of post-lab screens forming a post-lab portion of the experiential course content, wherein the introduction portion, pre-lab portion, lab portion, and post-lab portion are discrete course portions of the experiential course content. In addition, or alternatively, the server(s) can be configured to receive, from the user device via the GUI, user input including a set of parameters defining a set of pathways corresponding to the plurality of discrete course portions; and transmitting, via a communication network, the experiential course content to a client device of a learner user.

In one aspect, the disclosed technology relates to systems and methods including a server, communicatively coupled to a network, and including at least one processor executing specific computer-executable instructions within a memory that, when executed, cause the server to access a database to obtain candidate screen data, the candidate screen data including a set of candidate introduction screens, a set of candidate pre-lab screens, a set of candidate lab experiment screens, and a set of candidate post-lab screens; provide, to a user device of a content creator, graphical user interface (GUI) data for display as part of a GUI on the user device, the GUI data including the candidate screen data. In such examples, the server may, thus, receive, from the user device via the GUI, a user selection of a plurality of screens for configuring an experiential course. In an example, the server may receive user selection of: a subset of introduction screens selected from the candidate introduction screens, the subset of introduction screens forming an introduction portion of an experiential course content, a subset of pre-lab screens selected from the candidate pre-lab screens, the subset of pre-lab screens forming a pre-lab portion of the experiential course content, a subset of lab experiment screens selected from the candidate lab experiment screens, the subset of lab experiment screens forming a lab portion of the experiential course content, and a subset of post-lab screens selected from the candidate post-lab screens, the subset of post-lab screens forming a post-lab portion of the experiential course content. In such examples, the introduction portion, pre-lab portion, lab portion, and post-lab portion include discrete course portions of the experiential course content. In an example, specific screens (e.g., screen templates) may be available for inclusion for specified portions of an experiential course. In an illustrative example, a screen representing a lab simulation may be selectively available for an experiment portion of the experiential course. In such examples, the server may receive, from the user device via the GUI, user input including a set of parameters defining a set of pathways corresponding to the plurality of discrete course portions. In some examples, the server may transmit, via a communication network, the experiential course content to a client device of a learner user. In an example, the server may transmit the experiential course content to a client device of a learner user upon the learner user enrolling in a particular course or upon receiving access credentials that provide the learner user with certain privileges to access the experiential course content or at least a portion of the experiential course content (e.g., an introduction section, etc.).

In one aspect, the disclosed technology relates to systems and methods including one or more server hardware computing devices or client hardware computing devices, communicatively coupled to a network, and each including at least one processor executing specific computer-executable instructions within a memory that, when executed, cause the system to access a database configured to store multiple portions of experiential course content. These multiple portions may, in some instances, correspond to a particular type of course, where a learner user is able to interact with and experience a lab aspect of a particular course (e.g., an engineering lab, a biology lab, etc.). The database may further include a set of candidate screens. These screens may correspond to various portions of the experiential course content. In an example, a first set of candidate screens may correspond to a first section of a course (e.g., a pre-lab portion relative to one or more available courses), a second set of candidate screens may correspond to a second section of the course (e.g., a post-lab portion relative to one or more available courses), and so forth. The at least one processor of the server may, in some instances, further provide a graphical user interface (GUI) configured to elicit, from a user, a selection of a particular set of screens from a user. The systems and methods further provide for receiving, from the user device via the GUI, a set of parameters defining a set of pathways, the set of pathways configured to route a learner user through the experiential course. The experiential course content may then be transmitted to the learner user. In such instances, the client device of the learner user may receive GUI data configured to provide a GUI that routes the learner user through the experiential course according to the set of parameters.

Accordingly, a client device of a learner user may receive GUI data configured to provide a GUI that routes the learner user through an experiential course according to a set of predefined parameters. In some examples, the client device may receive user input from the learner user. Pursuant to the user input, the client device may provide, via the GUI, one or more predefined pathways through the experiential course content. In an illustrative example, the learner user may navigate, pursuant to the pathways, experiential course content defined for the experiential course. In some examples, the learner user may start at an introduction section of the experiential course and navigate through to a post-lab section of the experiential course. Accordingly, the pathways may allow the learner user to navigate from the introduction section to a laboratory experiment section of the experiential course. In some examples, a pre-lab section may precede the lab experiment section. In the pre-lab section, a learner user may access various learning course data items corresponding to the pre-lab portion of the experiential course.

The above features and advantages of the disclosed technology will be better understood from the following detailed description taken in conjunction with the accompanying drawings.

DETAILED DESCRIPTION

Figure 1:
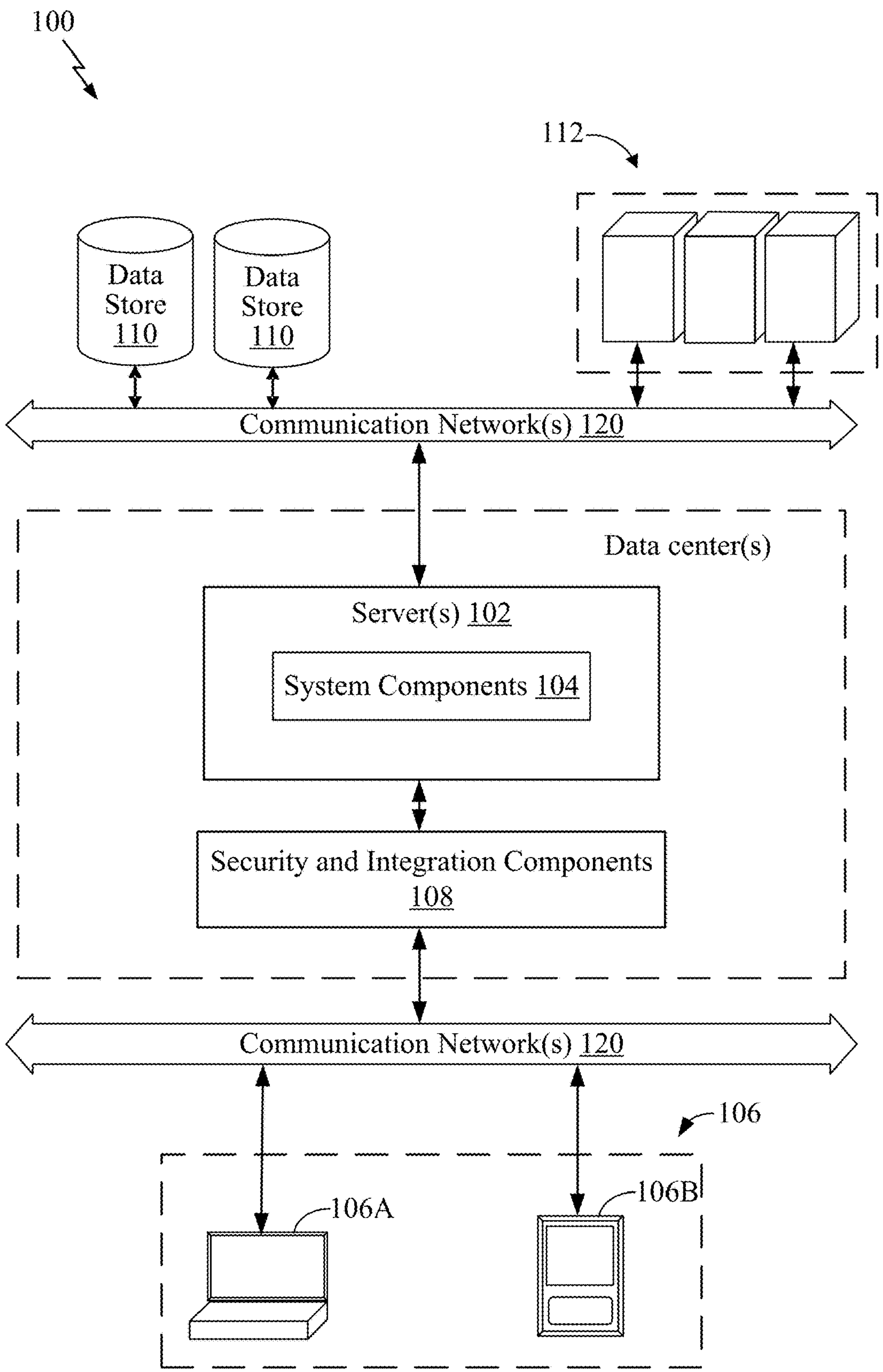
FIG. 1 illustrates a system level block diagram for providing the disclosed experiential course builder system.

The disclosed technology will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

In online learning environments in which a user (e.g., a learner user, a content creator, etc.) is presented with learning information, the content presented to the user may be limited. In such examples, a system administrator, for example, may be unable to change what a learner user sees. Further, learner users at respective client devices are not able to effectively communicate information related to particular electronic materials. In other words, systems are unable to effectively capture and share information received from a first user about particular electronic materials to one or more further users. If such content is customizable at all, it is often limited to a single method of personalizing content. As such, certain types of systems may be unable to respond to the learner user, or otherwise display personalized content, responsive to user interactivity, that is unique to that learner user.

In some examples, the disclosed technology includes an experiential course builder system. In an example, the experiential course builder may include an editor a so-called "e-text," that utilizes back-end and in some examples, machine learning (ML) models and/or artificial intelligence (AI) algorithms (e.g., based on stored feature data, data from other research, etc.). In some examples, the content management system can be configured to customize the experience for the content creator, so that the content management system is able to provide customized content for a user (e.g., a learner user, a content creator, etc.).

As would be appreciated by one of skill in the art, the dynamic display of experiential course content and course parameter settings (e.g., responsive to user input), as disclosed herein, represents a significant technological advance over prior implementations. Specifically, the disclosed techniques can identify and display a limited set of experiential course content portions, resulting in an increased efficiency in accessing the relevant content quickly and allowing user interactions with multiple content portions. Further, the disclosed techniques can yield processing efficiency benefits, as well. For example, a user (e.g., a content creator) may be presented with the relevant course screens based on a portion of the course that the user is configuring (e.g., building) at the time. When the user is selecting screens for a next portion of the course, the system may present the relevant course screens based on that next portion. In this way, the system can be configured to conserve processing, memory, and/or power resources while selectively presenting experiential course content to a learner user according to the portion of the experiential course the content creator is configuring. As such, the examples described herein represent significant improvements in this computer-related technology.

Additional examples disclosed herein also represent improvements in computer-related technology. For example, the experiential course builder system may receive over-the-air (OTA) updates to keep content (e.g., screen templates, components, etc.) stored in the database current. In addition, an administrative user (e.g., a teacher, etc.) may request to view remotely a current state of experiential course content with which a learner user is presently engaged and the results of the request may be displayed in a user-friendly graphical user interface (GUI). Other example improvements include the ability to call external sources of information to provide a greater relevance and complexity to an experiential course and in some examples, the ability to call APIs (e.g., question bank APIs) to perform additional work within the system.

The ideas disclosed herein exist within the realm of computer-related technology. In an example, the display of information in a graphical user interface (GUI) (e.g., an interactive user interface), where the relevant data does not necessarily reside in a storage device locally coupled to the relevant display device, cannot be replicated outside the realm of computer-related technology. For example, the multi-faceted information (e.g., experiential course content portions, etc.) are simultaneously and/or dynamically obtained from disparate systems, identified by metadata in some instances, and simultaneously or dynamically presented in a GUI. This multi-faceted information is presented based on a particular portion of the experiential course the content creator is configuring at the time. Additionally, the experiential course builder system may allow a content creator to access and view a current progress state of the experiential course content for a learner user while the learner user is in the process of navigating through the experiential course. The experiential course builder system may conserve processing resources here as well by accessing the current progress state of the learner user advantageously in response to receiving a request for the current progress state. This would be rather than accessing the current progress state at, for example, random intervals when the administrator user perhaps has not submitted a request for such access yet.

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458). The various examples of dynamic graphical user interfaces (GUIs) of the present disclosure are the result of significant research, development, improvement, iteration, and testing and in some examples, provide a particular manner of summarizing and presenting information in electronic devices. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the GUIs described herein may provide an optimized presentation of experiential course content and may enable a user to more quickly access, navigate, assess, and utilize such information than with previous systems which can be slow, complex and/or difficult to learn, particularly to novice users. For example, users would face the problem of having to create courses from scratch while having to search through content that the user may want to include in the course without any deference provided on how much or what content to present based on what portion of the experiential course a user was configuring at the time. Presentation of concise and compact information on a particular user interface associated with the content creator makes for efficient use of the information available and optimal use of the experiential course content.

In accordance with the present disclosure, the experiential course builder system can be configured to enable a client device to display, access, and request the most relevant data with respect to experiential course content information. Further, the interactive and dynamic graphical user interfaces (GUIs) described herein are enabled by innovations in efficient interactions between the user interfaces and underlying systems and components. For example, disclosed herein are improved methods of receiving user inputs, extracting useful information from the user input, correlating such information across various different data structures, delivering the information to various system components, automatic and dynamic execution of complex processes in response to the input delivery, automatic interaction among various components and processes of the system, and automatic and dynamic updating of the GUIs. The interactions and presentation of the experiential course content via the GUIs described herein may accordingly provide cognitive and ergonomic efficiencies and advantages over previous systems.

Various aspects of the disclosure will now be described with regard to certain examples and techniques, which are intended to illustrate but not limit the disclosure. Although the examples and techniques described herein will focus, for the purpose of illustration, specific calculations and algorithms, one of skill in the art will appreciate the examples are illustrate only, and are not intended to be limiting. For example, although described in the context of a connected vehicle, the disclosed data transfer optimization techniques can be implemented in other mobile networked computing environments.

FIG. 1 illustrates an example of a distributed computing environment 100. In some examples, the distributed computing environment 100 may include one or more server(s) 102 (e.g., data servers, computing devices, computers, etc.), one or more client computing devices 106, and other components that may implement one or more of the various techniques of the disclosure. Other devices, such as specialized sensor devices, etc., may interact with the client computing device(s) 106 and/or the server(s) 102. The server(s) 102, client computing device(s) 106, or any other devices may be configured to implement a client-server model or any other distributed computing architecture. In an illustrative example, the client devices 106 may include a first client device 106A and a second client device 106B. The first client device 106A may correspond to a first learner user in a class and the second client device 106B may correspond to a second learner user in the class or another class.

In some examples, the server(s) 102, the client computing device(s) 106, and any other disclosed devices may be communicatively coupled via one or more communication network(s) 120. The communication network(s) 120 may be any type of network known in the art supporting data communications. In some examples, network 120 may be a local area network (LAN; e.g., Ethernet, Token-Ring, etc.), a wide-area network (e.g., the Internet), an infrared or wireless network, a public switched telephone networks (PSTNs), a virtual network, etc. Network 120 may use any available protocols, such as, e.g., transmission control protocol/Internet protocol (TCP/IP), systems network architecture (SNA), Internet packet exchange (IPX), Secure Sockets Layer (SSL), Transport Layer Security (TLS), Hypertext Transfer Protocol (HTTP), Secure Hypertext Transfer Protocol (HTTPS), Institute of Electrical and Electronics (IEEE) 802.11 protocol suite or other wireless protocols, and the like.

Figure 2:
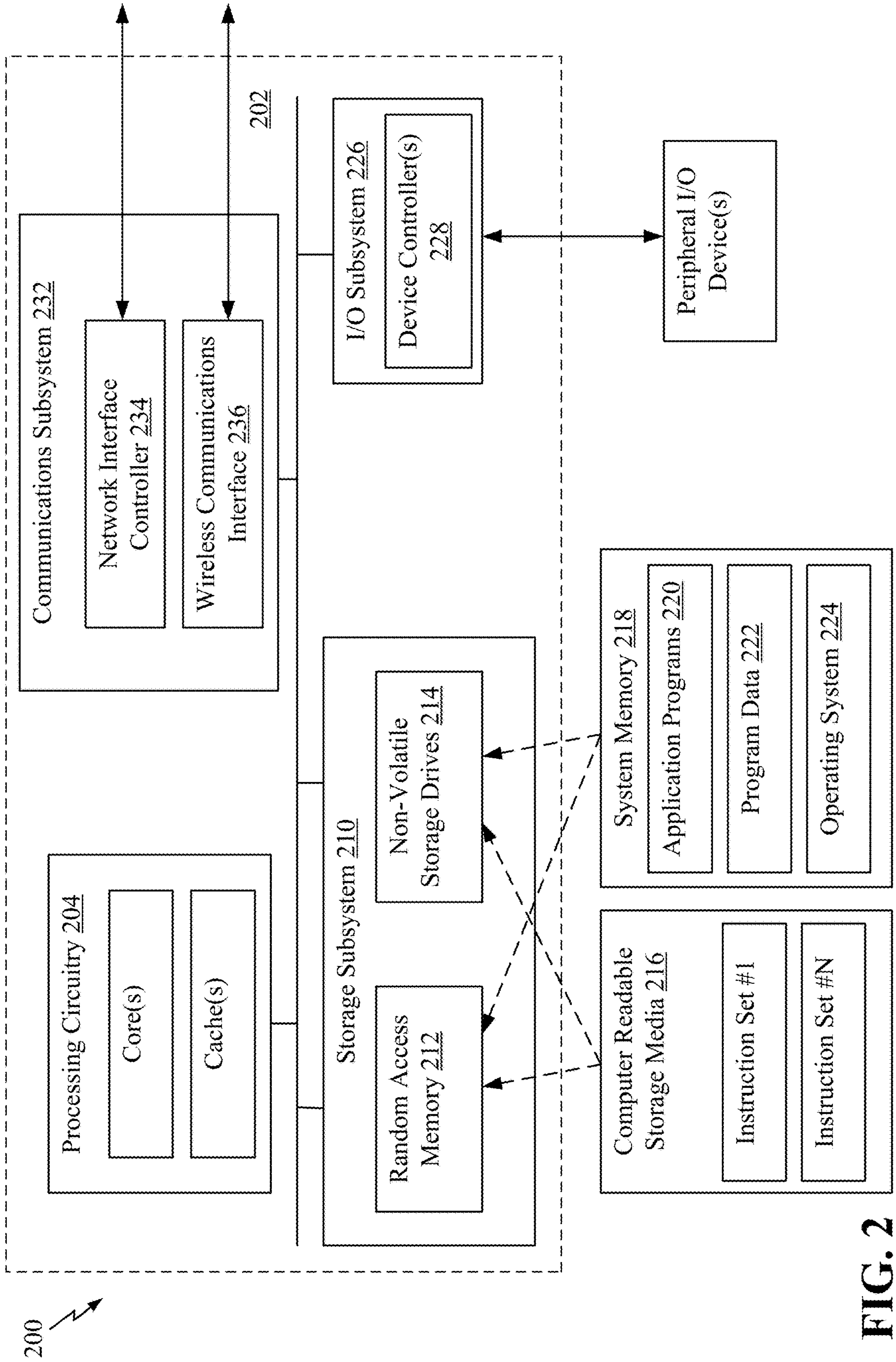
FIG. 2 illustrates a system level block diagram for providing the disclosed experiential course builder system, in accordance with various aspects of the techniques described in this disclosure.

While FIGS. 1 and/or 2 show a distributed computing system in accordance with one or more of the various techniques of the disclosure, the techniques of this disclosure are not so limited. That is, these examples from FIGS. 1 and 2 are not intended to be limiting within the context of the disclosed technology. A person of ordinary skill in the art will understand that distributed computing systems may be configured in a number of different ways to implement the disclosed technology, including the experiential course builder system.

The subsystems and components within the server(s) 102 and the client computing device(s) 106 may be implemented in hardware, firmware, software, or combinations thereof. Various different subsystems and/or components 104 may be implemented on server 102. Users operating the client computing device(s) 106 may initiate one or more client applications to use services provided by these subsystems and components. Various different system configurations are possible in different distributed computing environments 100 and content distribution networks. Server 102 may be configured to run one or more server software applications or services, for example, web-based or cloud-based services, to support content distribution and interaction with client computing device(s) 106. Users operating client computing device(s) 106 may in turn utilize one or more client applications (e.g., virtual client applications). Users may do so to interact with server 102 to utilize the services provided by these components. The client computing device(s) 106 may be configured to receive and execute client applications over the communication network(s) 120. Such client applications may be web browser-based applications and/or standalone software applications, such as mobile device applications. The client computing device(s) 106 may receive client applications from server 102 or from other application providers (e.g., public or private application stores).

As shown in FIG. 1, various security and integration components 108 may be utilized to manage communications over the communication network(s) 120 (e.g., a file-based integration scheme, a service-based integration scheme, etc.). In some examples, the security and integration components 108 may implement various security features for data transmission and storage, such as authenticating users or restricting access to unknown or unauthorized users. In some examples, the security and integration components 108 may include dedicated hardware, specialized networking components, and/or software (e.g., web servers, authentication servers, firewalls, routers, gateways, load balancers, etc.) within one or more data centers in one or more physical location(s) and/or operated by one or more entities, and/or may be operated within a cloud infrastructure. In various implementations, the security and integration components 108 may transmit data between the various devices in the distribution computing environment 100 (e.g., in a content distribution system or network). In some examples, the security and integration components 108 may use secure data transmission protocols and/or encryption (e.g., File Transfer Protocol (FTP), Secure File Transfer Protocol (SFTP), and/or Pretty Good Privacy (PGP) encryption) for data transfers, etc.).

The security and integration components 108 may implement one or more web services (e.g., cross-domain and/or cross-platform web services) within the distribution computing environment 100. In some examples, the security and integration components 108 may be developed for enterprise use in accordance with various web service standards (e.g., the Web Service Interoperability (WS-I) guidelines). In an example, some web services may provide secure connections, authentication, and/or confidentiality throughout the network using technologies such as SSL, TLS, HTTP, HTTPS, WS-Security standard (providing secure SOAP messages using XML encryption), etc. In some examples, the security and integration components 108 may include specialized hardware, network appliances, and the like (e.g., hardware-accelerated SSL and HTTPS), possibly installed and configured between one or more server(s) 102 and other network components. In such examples, the security and integration components 108 may thus provide secure web services, thereby allowing any external devices to communicate directly with the specialized hardware, network appliances, etc.

A distribution computing environment 100 may further include one or more data stores 110. In some examples, the one or more data stores 110 may include, and/or reside on, one or more back-end servers 112, operating in one or more data center(s) in one or more physical locations. In such examples, the one or more data stores 110 may communicate data between one or more devices, such as those connected via the one or more communication network(s) 120. In some cases, the one or more data stores 110 may reside on a non-transitory storage medium within one or more server(s) 102. In some examples, data stores 110 and back-end servers 112 may reside in a storage-area network (SAN). In addition, access to one or more data stores 110, in some examples, may be limited and/or denied based on the processes, user credentials, and/or devices attempting to interact with the one or more data stores 110.

With reference now to FIG. 2, a block diagram of an example computing system 200 is shown. The computing system 200 (e.g., one or more computers) may correspond to any one or more of the computing devices or servers of the distribution computing environment 100, or any other computing devices described herein. In an example, the computing system 200 may represent an example of one or more server(s) 102 and/or of one or more server(s) 112 of the distribution computing environment 100. In another example, the computing system 200 may represent an example of the client computing device(s) 106 of the distribution computing environment 100. In some examples, the computing system 200 may represent a combination of one or more computing devices and/or servers of the distribution computing environment 100.

In some examples, the computing system 200 may include processing circuitry 204, such as one or more processing unit(s), processor(s), etc. In some examples, the processing circuitry 204 may communicate (e.g., interface) with a number of peripheral subsystems via a bus subsystem 202. These peripheral subsystems may include, for example, a storage subsystem 210, an input/output (I/O) subsystem 226, and a communications subsystem 232.

In some examples, the processing circuitry 204 may be implemented as one or more integrated circuits (e.g., a conventional micro-processor or microcontroller). In an example, the processing circuitry 204 may control the operation of the computing system 200. The processing circuitry 204 may include single core and/or multicore (e.g., quad core, hexa-core, octo-core, ten-core, etc.) processors and processor caches. The processing circuitry 204 may execute a variety of resident software processes embodied in program code, and may maintain multiple concurrently executing programs or processes. In some examples, the processing circuitry 204 may include one or more specialized processors, (e.g., digital signal processors (DSPs), outboard, graphics application-specific, and/or other processors).

In some examples, the bus subsystem 202 provides a mechanism for intended communication between the various components and subsystems of computing system 200. Although the bus subsystem 202 is shown schematically as a single bus, alternative examples of the bus subsystem may utilize multiple buses. In some examples, the bus subsystem 202 may include a memory bus, memory controller, peripheral bus, and/or local bus using any of a variety of bus architectures (e.g., Industry Standard Architecture (ISA), Micro Channel Architecture (MCA), Enhanced ISA (EISA), Video Electronics Standards Association (VESA), and/or Peripheral Component Interconnect (PCI) bus, possibly implemented as a Mezzanine bus manufactured to the IEEE P1386.1 standard).

In some examples, the I/O subsystem 226 may include one or more device controller(s) 228 for one or more user interface input devices and/or user interface output devices, possibly integrated with the computing system 200 (e.g., integrated audio/video systems, and/or touchscreen displays), or may be separate peripheral devices which are attachable/detachable from the computing system 200. Input may include keyboard or mouse input, audio input (e.g., spoken commands), motion sensing, gesture recognition (e.g., eye gestures), etc. As some examples, input devices may include a keyboard, pointing devices (e.g., mouse, trackball, and associated input), touchpads, touch screens, scroll wheels, click wheels, dials, buttons, switches, keypad, audio input devices, voice command recognition systems, microphones, three dimensional (3D) mice, joysticks, pointing sticks, gamepads, graphic tablets, speakers, digital cameras, digital camcorders, portable media players, webcams, image scanners, fingerprint scanners, barcode readers, 3D scanners, 3D printers, laser rangefinders, eye gaze tracking devices, medical imaging input devices, MIDI keyboards, digital musical instruments, and the like. In general, use of the term output device herein is intended to include all possible types of devices and mechanisms for outputting information from computing system 200, such as to a user (e.g., via a display device) or any other computing system, such as a second computing system 200. In an example, output devices may include one or more display subsystems and/or display devices that visually convey text, graphics and audio/video information (e.g., cathode ray tube (CRT) displays, flat-panel devices, liquid crystal display (LCD) or plasma display devices, projection devices, touch screens, etc.), and/or may include one or more non-visual display subsystems and/or non-visual display devices, such as audio output devices, etc. As some examples, output devices may include, indicator lights, monitors, printers, speakers, headphones, automotive navigation systems, plotters, voice output devices, modems, etc.

In some examples, the computing system 200 may include one or more storage subsystems 210, including hardware and software components used for storing data and program instructions, such as system memory 218 and computer-readable storage media 216. In some examples, the system memory 218 and/or the computer-readable storage media 216 may store and/or include program instructions that are loadable and executable on the processor(s) 204. In an example, the system memory 218 may load and/or execute an operating system 224, program data 222, server applications, application program(s) 220 (e.g., client applications), Internet browsers, mid-tier applications, etc. In some examples, the system memory 218 may further store data generated during execution of these instructions.

In some examples, the system memory 218 may be stored in volatile memory (e.g., random-access memory (RAM) 212, including static random-access memory (SRAM) or dynamic random-access memory (DRAM)). In an example, the RAM 212 may contain data and/or program modules that are immediately accessible to and/or operated and executed by the processing circuitry 204. In some examples, the system memory 218 may also be stored in non-volatile storage drives 214 (e.g., read-only memory (ROM), flash memory, etc.). In an example, a basic input/output system (BIOS), containing the basic routines that help to transfer information between elements within the computing system 200 (e.g., during start-up), may typically be stored in the non-volatile storage drives 214.

In some examples, the storage subsystem 210 may include one or more tangible computer-readable storage media 216 for storing the basic programming and data constructs that provide the functionality of some examples of this disclosure. In an example, the storage subsystem 210 may include software, programs, code modules, instructions, etc., that may be executed by the processing circuitry 204, in order to provide the functionality described herein. In some examples, data generated from the executed software, programs, code, modules, or instructions may be stored within a data storage repository within the storage subsystem 210. In some examples, the storage subsystem 210 may also include a computer-readable storage media reader connected to the computer-readable storage media 216.

In some examples, the computer-readable storage media 216 may contain program code, or portions of program code. Together and, optionally, in combination with the system memory 218, the computer-readable storage media 216 may comprehensively represent remote, local, fixed, and/or removable storage devices plus storage media for temporarily and/or more permanently containing, storing, transmitting, and/or retrieving computer-readable information. In some examples, the computer-readable storage media 216 may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer-readable media. This can also include nontangible computer-readable media, such as data signals, data transmissions, or any other medium which can be utilized to transmit the desired information and which can be accessed by the computing system 200. In an example, the computer-readable storage media 216 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media.

In some examples, the computer-readable storage media 216 may include, but is not limited to, Zip® drives, flash memory cards, universal serial bus (USB) flash drives, secure digital (SD) cards, DVD disks, digital video tape, and the like. In some examples, the computer-readable storage media 216 may include, solid-state drives (SSD) based on non-volatile memory such as flash-memory based SSDs, enterprise flash drives, solid state ROM, and the like, SSDs based on volatile memory such as solid-state RAM, dynamic RAM, static RAM, DRAM-based SSDs, magneto-resistive RAM (MRAM) SSDs, and hybrid SSDs that use a combination of DRAM and flash memory-based SSDs. The disk drives and their associated computer-readable media may provide non-volatile storage of computer-readable instructions, data structures, program modules, and other data for the computing system 200.

In some examples, the communications subsystem 232 may provide a communication interface from the computing system 200 and external computing devices via one or more communication networks, including local area networks (LANs), wide area networks (WANs) (e.g., the Internet), and various wireless telecommunications networks. As illustrated in FIG. 2, the communications subsystem 232 may include, for example, one or more network interface controllers (NICs) 234, such as Ethernet cards, Asynchronous Transfer Mode NICs, Token Ring NICs, and the like, as well as one or more wireless communications interfaces 236, such as wireless network interface controllers (WNICs), wireless network adapters, and the like. Additionally, and/or alternatively, the communications subsystem 232 may include one or more modems (telephone, satellite, cable, ISDN), synchronous or asynchronous digital subscriber line (DSL) units, Fire Wire® interfaces, USB® interfaces, and the like. Communications subsystem 232 also may include radio frequency (RF) transceiver components for accessing wireless voice and/or data networks (e.g., using cellular telephone technology, advanced data network technology, such as 4G, 5G or EDGE (enhanced data rates for global evolution), Wi-Fi (IEEE 802.11 family standards, or other mobile communication technologies, or any combination thereof), global positioning system (GPS) receiver components, and/or other components.

In some examples, the communications subsystem 232 may also receive input communication in the form of structured and/or unstructured data feeds, event streams, event updates, and the like, on behalf of one or more users who may use or access the computing system 200. In an example, the communications subsystem 232 may be configured to receive data feeds in real-time from users of social networks and/or other communication services, web feeds such as Rich Site Summary (RSS) feeds, and/or real-time updates from one or more third party information sources (e.g., data aggregators). Additionally, the communications subsystem 232 may be configured to receive data in the form of continuous data streams, which may include event streams of real-time events and/or event updates. In some examples, the communications subsystem 232 may output such structured and/or unstructured data feeds, event streams, event updates, and the like to one or more data stores that may be in communication with one or more streaming data source computing systems (e.g., one or more data source computers, etc.) coupled to the computing system 200. The various physical components of the communications subsystem 232 may be detachable components coupled to the computing system 200 via a computer network (e.g., a communication network 120), a FireWire® bus, or the like, and/or may be physically integrated onto a motherboard of the computing system 200. In some examples, the communications subsystem 232 may be implemented in whole or in part by software.

Due to the ever-changing nature of computers and networks, the description of the computing system 200 depicted in the figure is intended only as a specific example. Many other configurations having more or fewer components than the system depicted in the figure are possible. In an example, customized hardware might also be utilized and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement any one or more of the various disclosed techniques.

Experiential Course Builder System

Figure 3:
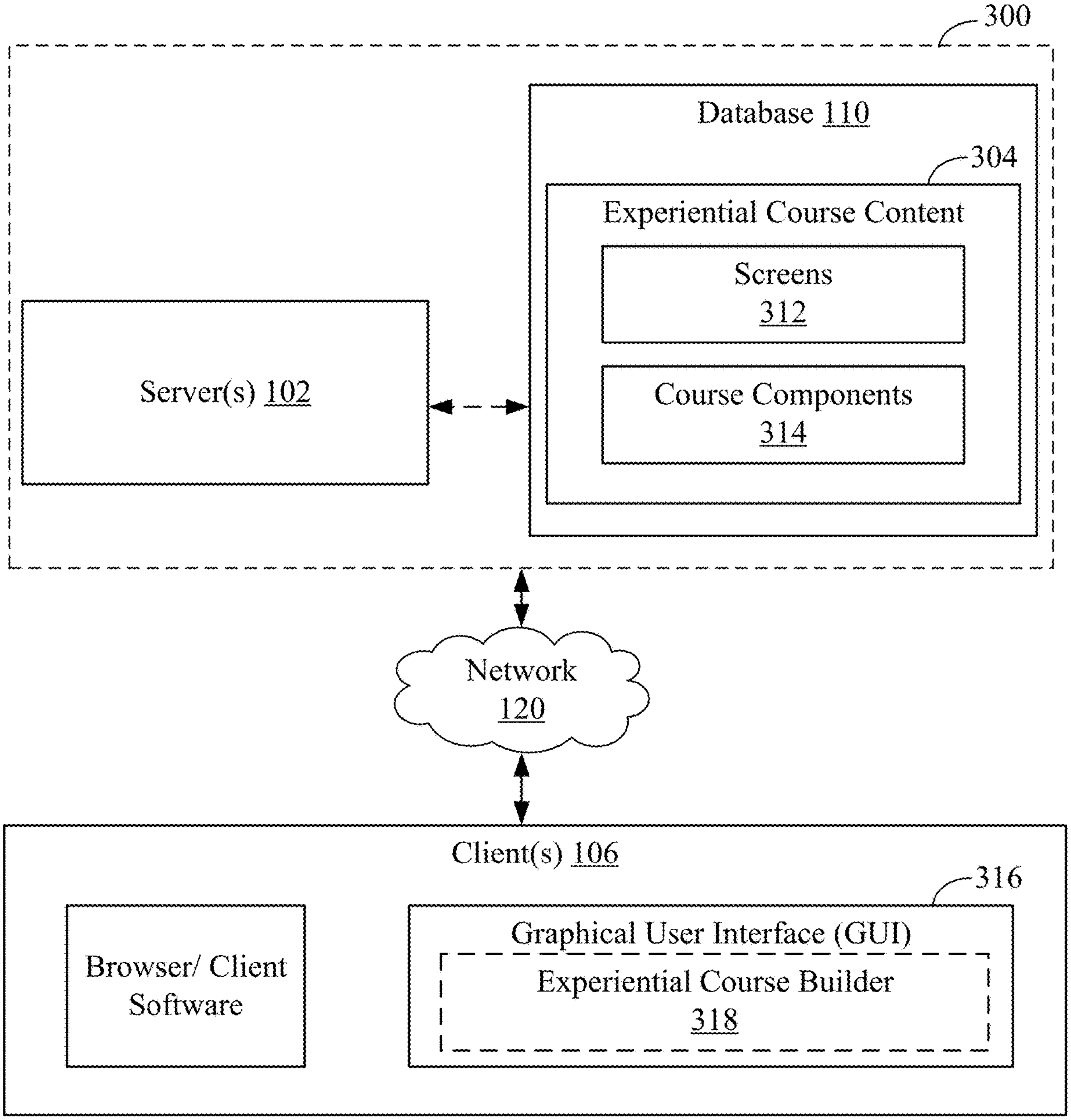
FIG. 3 illustrates a system level block diagram of a content management system that facilitates the disclosed experiential course builder system, in accordance with various aspects of the techniques described in this disclosure.

FIG. 3 illustrates a system level block diagram of an experiential course builder system 300, according to some examples. The disclosed experiential course builder system 300 can be configured to manage experiential course content 304, such as a set of screens 312 and/or a set of course components 314, for defining an experiential course. The experiential course may include a plurality of discrete course portions. In such examples, the set of screens 312 may include a plurality of screen subsets. In an example, the subsets of screen may correspond to discrete portions of the experiential course. In an illustrative example, a first subset of screens may correspond to an introduction portion of the experiential course, and a second subset of screens may correspond to a pre-lab portion of the experiential course. In some examples, the first subset of screens may correspond to a first set of candidate screens. Likewise, the second subset of screens may correspond to a second set of candidate screens. In some instances, the first set of candidate screens and the second set of candidate screens may include at least some of the same screens (e.g., screen templates). In an example, one or more candidate screens in the set of candidate screens may be provided as part of the first set of candidate screens and as part of the second set of candidate screens. However, in some instances, a particular candidate screen (e.g., a screen template of a particular type) may be reserved for specific portions of the experiential course. In such instances, the experiential course builder system 300 may dynamically present a specific set screens for selection as a content creator configures individual portions of the experiential course.

In some examples, the experiential course builder system 300 may include a database 110, also referred to as a data store herein. The database 110 may be made up of one or more databases co-located or distributed in remote locations. The database 110 may include experiential course content 304. The experiential course content 304 may include an e-book (electronic version of a printed book), a document, a video, or any other suitable format of learning course content. In some examples, the experiential course content 304 may further include courseware elements (e.g., courses, units, assessments, lessons, labs, etc.). A given experiential course (e.g., a lab, a course that includes a lab aspect to the course, etc.) may include experiential course content 304 defined for the experiential course.

In some examples, an experiential course (e.g., a lab lesson, etc.) may include a set of screens 312. The set of screens 312 are designed in a specific way to organize and arrange data and to teach a learner user one or more objectives. In an example, a lesson may include a set of screens designed with targeted feedback in order to teach the learner user the one or more objectives. In some examples, the feedback may include adaptive feedback responsive to one or more interaction(s) of a learner user with the experiential course content 304.

In some examples, the experiential course content 304 may include one or more assessments. In such examples, an assessment may include a set of screens 312 designed in a specific way to assess an ability of a learner user to meet one or more learning objectives. In some examples, these assessments may include any combination of question types (e.g., true/false, multiple choice, essay, etc.). In another example, an assessment may include quiz features and/or functionality allowing learner users to navigate a set of questions in any combination of orders.

In some examples, the server 102 in coordination with the database 110 may configure the system components 104 (see FIG. 1) for various functions, including, e.g., providing an experiential course builder system 300, receiving user selection of a set of screens for defining a plurality of discrete course portions for an experiential course, etc. For example, the system components 104 may be configured to implement one or more of the functions described below in relation to FIG. 4, including, e.g., blocks 402, 404, 406, and/or 408.

In further aspects of the disclosure, the server 102 in coordination with the database 110 may further configure the system components 104 for various additional functions, including, e.g., determining a first subset of screens corresponding to a first portion of the experiential course, determining a second subset of screens corresponding to a second portion of the experiential course, determining a third subset of screens corresponding to a third portion of the experiential course, determining a fourth subset of screens corresponding to a fourth portion of the experiential course, and/or determining a set of pathway parameters for configuring the subsets of screens for a given experiential course being created via the experiential course builder system 300. In an example, the system components 104 may be configured to implement one or more of the functions described below in relation to FIG. 4, including, e.g., blocks 404 and/or 406.

In some instances, the database 110 may include user data (e.g., a set of learner user data items). In such examples, the experiential course builder system 300 may store and/or manage the user data in accordance with one or more of the various techniques of the disclosure. In some examples, the user data may include a status of a learner user partaking in the experiential course. In addition, the user data may include user history, user scores, user performance, user preferences, and the like.

Content Creator Configuring an Experiential Course

Figure 4:
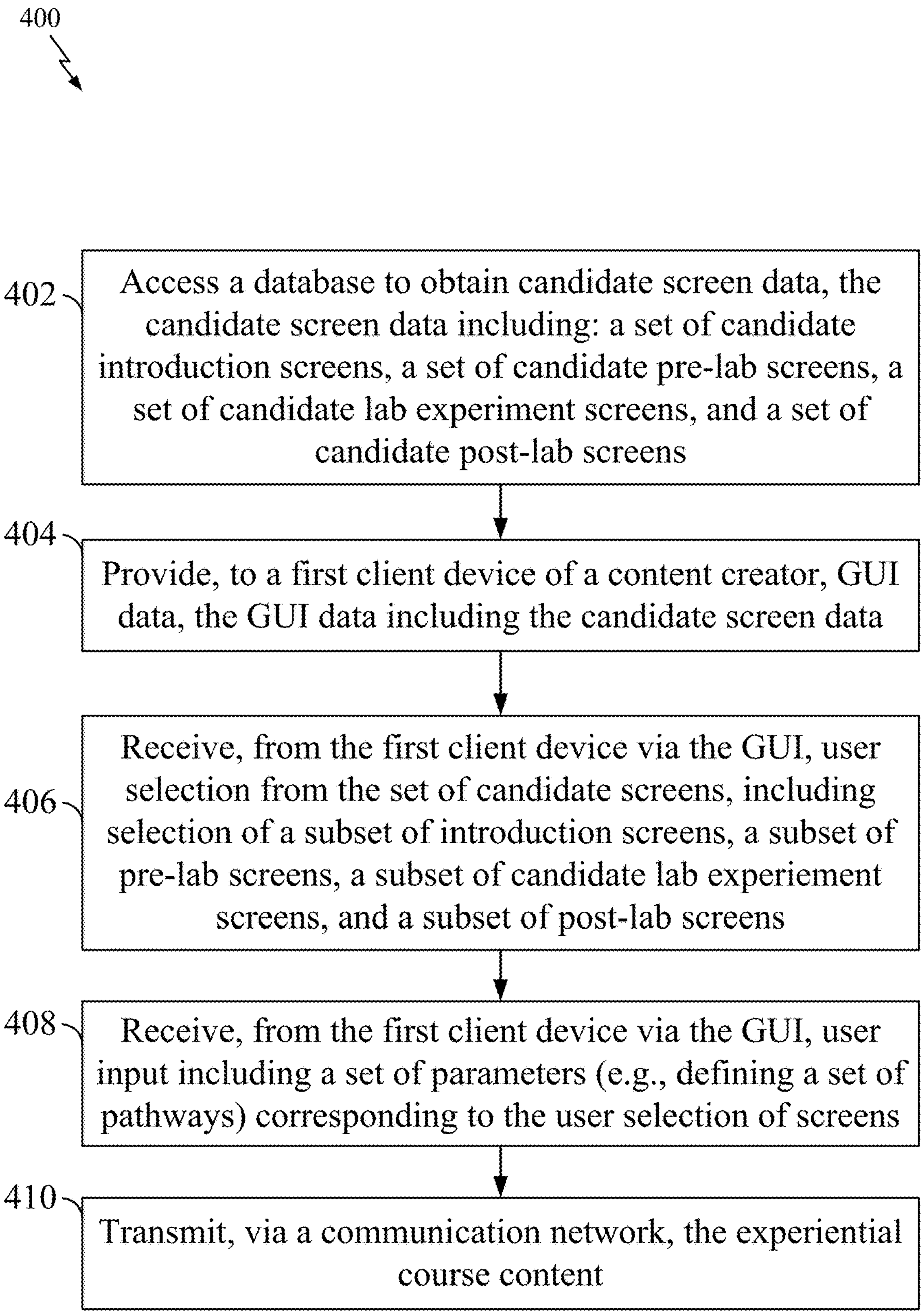
FIG. 4 is a flowchart illustrating an example method and technique for providing an experiential course builder system, in accordance with various aspects of the techniques described in this disclosure.

FIG. 4 is a flowchart illustrating an example method and technique for generating and providing an experiential course, in accordance with various aspects of the techniques described in this disclosure. The flowchart of FIG. 4 utilizes various GUI screens of a GUI, described below, for example, with reference to FIGS. 5-14, for example. In some examples, the process 400 may be carried out by the server(s) 102 illustrated in FIG. 3, e.g., employing circuitry and/or software configured according to the block diagram illustrated in FIG. 2. In some examples, the process 400 may be carried out by any suitable apparatus or means for carrying out the functions or algorithm described below. In some examples, any systems and/or GUI screens are used to implement the process 400. Additionally, although the blocks of the flowchart 400 are presented in a sequential manner, in some examples, one or more of the blocks may be performed in a different order than presented, in parallel with another block, or bypassed.

At block 402, a server 102 (e.g., one or more of the server(s) 102, also referred to as the server 102) accesses a database 110 to obtain candidate screen data. The candidate screen data may include candidate screens of the set of screens 312 that include: a set of candidate introduction screens, a set of candidate pre-lab screens, a set of candidate lab experiment screens, and a set of candidate post-lab screens. In an example, the server 102 may query a database 110 to retrieve the candidate screen data stored in the database 110. The server 102 may provide one or more queries or requests to the database 110 to obtain the candidate screen data. In an example, the server 102 may request a set of introduction screens in instances where a content creator is selecting screens for an introduction portion of experiential course content. The server 102 may provide further requests for other sets of candidate screens (e.g., the candidate pre-lab screens, the candidate lab experiment screens, and/or the candidate post-lab screens).

At block 404, the server 102 may transmit graphical user interface (GUI) data, which includes the candidate screen data, to a first client device 106 of a content creator. The GUI data may be configured to cause a presentation or display of one or more of the candidate screens on the first client device 106 (e.g., on a GUI of the first client device 106). For example, in response to the GUI data, the first client device 106 may display: the set of candidate introduction screens, or a portion thereof; the set of candidate pre-lab screens, or a portion thereof; the set of candidate lab experiment screens, or a portion thereof; and/or the set of candidate post-lab screens, or a portion thereof. In some examples, the various types of candidate screens may be displayed separate from one another (e.g., in different areas or windows of the GUI or at different times on the GUI). For example, one or more candidate introduction screens may be shown on one portion of the GUI, while one or more candidate pre-lab screens are shown in another portion of the GUI. The candidate screens making up the candidate screen data can be classified (e.g., tagged, assigned classification metadata, etc.) as belonging to a particular type or category of screen (e.g., introduction, pre-lab, lab experiment, post-lab). In some examples, one or more candidate screens are associated with only one type or category, one or more candidate screen may be associated with more than one type or category (but not all types or categories), and one or more candidate screens may be associated with all types or categories. In some examples, the type of each candidate screen or other characteristics of each candidate screen are provided as part of the GUI data for display on the GUI of the first client device 106 in association with one or more corresponding candidate screens.

Figure 6:
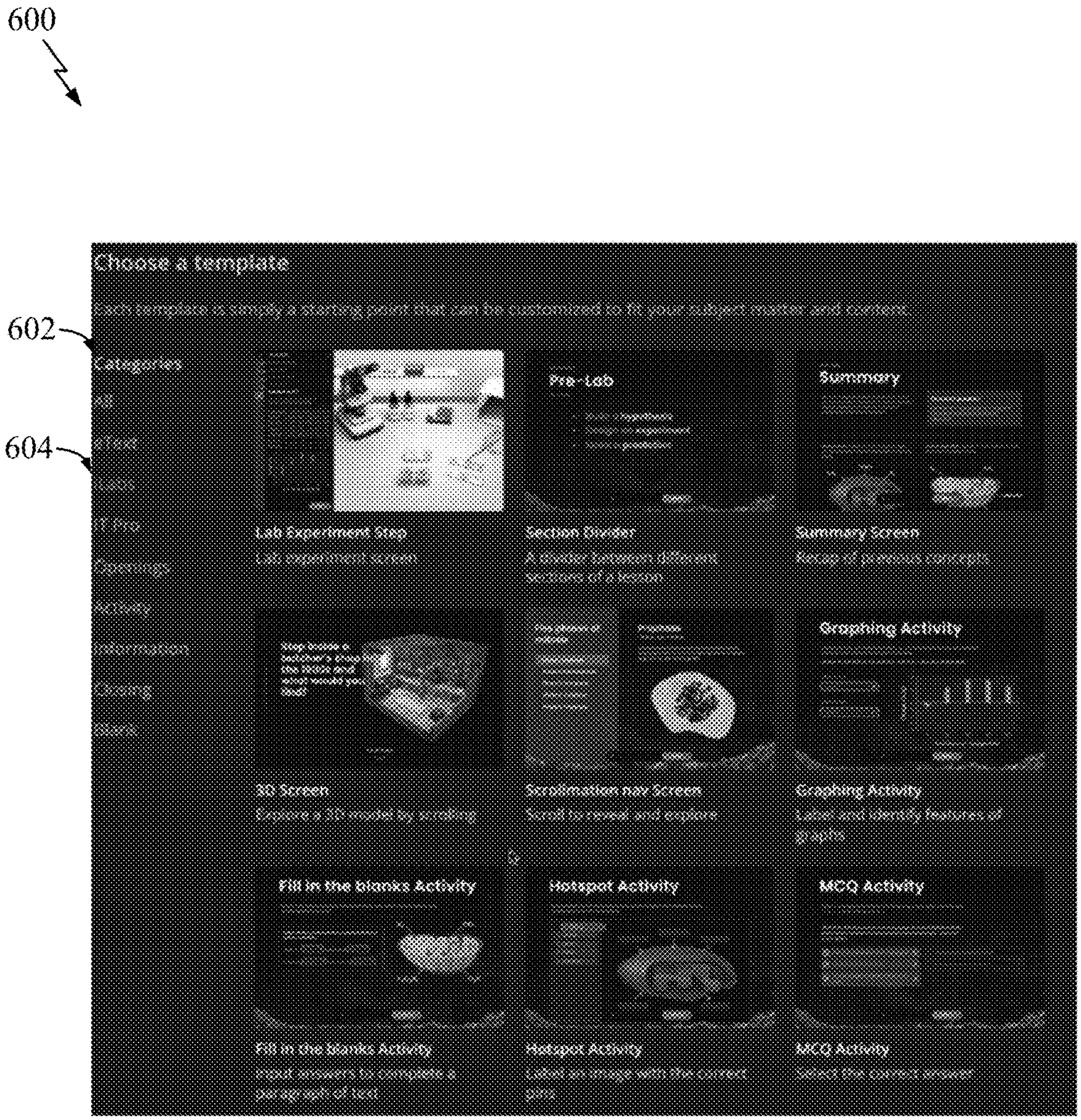
FIG. 6 is a diagram conceptually illustrating example experiential course content screens accessible via the experiential course builder system of FIG. 3, in accordance with various aspects of the techniques described in this disclosure.

At block 406, the server 102 may receive, from the first client device 106 via the GUI, user selection of one or more subsets of screens from the set of candidate screens. For example, the user selection may indicate a selection of a subset of introduction screens selected from the candidate introduction screens, a subset of pre-lab screens selected from the candidate pre-lab screens, a subset of lab experiment screens selected from the candidate lab experiment screens, and a subset of post-lab screens selected from the candidate post-lab screens. Here, the subset of introduction screens may form an introduction portion of an experiential course content, the subset of pre-lab screens may form a pre-lab portion of the experiential course content, the subset of lab experiment screens may form a lab portion of the experiential course content, and the subset of post-lab screens may form a post-lab portion of the experiential course content. The introduction portion, pre-lab portion, lab portion, and post-lab portion are discrete course portions of the experiential course content. In an example, the server 102 may cause the GUI screen on the client device 106 to present a set of candidate screens of various different types, for example, as shown in FIG. 6 (e.g., a 3D screen type, a summary screen type, etc.). The first client device 106 may receive a user selection of one of the sets of candidate screens displayed, which may serve as one or more of the subsets of candidate screens of the user selection in block 406.

In some examples, the user selection includes multiple selections, such as one selection of a set of candidate screens displayed on the GUI of the client device 106 for each of the discrete portions of the experiential course content. For example, the GUI on the client device 106 may display the candidate introduction screens (e.g., in a layout similar to shown in FIG. 6) and receive a selection from the user via the GUI of one or more of the candidate introduction screens that are to serve as the subset of introduction screens of the user selection. The GUI may then refresh and display the candidate pre-lab screens (e.g., in a layout similar to shown in FIG. 6) and receive a selection from the user via the GUI of one or more of the candidate pre-lab screens that are to serve as the subset of pre-lab screens of the user selection. A similar process of displaying and receiving selection of lab candidate screens and post-lab candidate screens may also be executed.

Additionally, the server 102 may provide a library of candidate screen templates from which the content creator may select for a particular discrete portion or portions of the experiential course content 304. Each template may be associated with subsets of candidate screens for one or more of the discrete portions of an experiential course content. Accordingly, a selection of a template made via the GUI and received by the server 102 may serve as the user selection and indicate the one or more subsets of screens from the set of candidate screens. For example, such a user selection may indicate to the server 102 one or more of the subset of introduction screens, the subset of pre-lab screens, the subset of lab experiment screens, and the subset of post-lab screens.

Additionally, a content creator may select a type of candidate screen via the GUI on the client device 106. The client device 106 may display on the GUI candidate screens or candidate screen templates from the candidate screen data that are of that particular type. The client device 106, via the GUI, may receive a selection of one or more of the candidate screens or candidate screen templates, which the client device 106 may provide to the server 102 as the user selection or portion thereof. The user selection may indicate one or more subsets of candidate screens in a similar manner as described above.

At block 408, the server 102 may receive, from the first client device 106 via the GUI, user input including a set of parameters defining a set of pathways corresponding to the plurality of discrete course portions. The set of parameters may include parameters defining a set of pathways corresponding to the plurality of discrete course portions and/or the screens thereof. The pathways may define the navigable pathways through the discrete course portions (and the screens thereof) of the experiential course content 304. In some examples, the set of parameters may include an ordering of the selected screens. In addition, or alternatively, the set of parameters may include a set of scenario definition information. The set of scenario definition information may specify conditions that define navigation between the selection of screens to allow a learner user to progress through the experiential course according to a set of predefined scenarios, as described further below with reference to FIGS. 9-14.

In some examples, the set of parameters may include one or more pathways configured to route a learner user through the experiential course content 304. The pathways may represent a set of parameters that control how a learner user navigates through the experiential course content 304. In an example, a pathway may include a set of conditions that, when satisfied, provide a user with certain privileges to advance through to a next portion of the experiential course content (e.g., a post-lab portion). In an example, a set of user privileges may include privileges assigned to a learner user as the learner user navigates an experiential course. The user privileges may limit how a learner user may navigate through the experiential course.

The server 102 may dynamically alter the user privileges as the learner user progresses through the experiential course. In another example, the server 102 may, include as part of the experiential course content 304, instructions for the client device 106 of the learner user to dynamically alter the user privileges as the learner user progresses through the experiential course. In an example, a learner user may have privileges to navigate a set of screens within a particular portion of the experiential course content. The set of user privileges may correspond to the set of conditions. The learner user may gain access privileges to advance to a next portion of the experiential course content when the learner user's progress status satisfies one or more criteria of the set of conditions. In such examples, the set of parameters defining the set of user privileges may effectively control navigation through the experiential course content. In addition, or alternatively, the set of parameters may control navigation pursuant to the set of pathways.

The server 102 may cause a client device 106 of a learner user to render predefined experiential course content 304 for the learner user to navigate the experiential course pursuant to the predefined pathways. The server 102 may apply the condition parameters to control navigation through the experiential course. In an example, when the server 102 receives user input from the client device 106 of the learner user, indicating one or more predefined conditions have been satisfied for the server 102 to dynamically alter the set of user privileges of the learner user. With the altered set of user privileges, the learner user may gain access to a next screen of the experiential course. In another example, the learner user may have reduced user privileges to proceed, such as where the learner user does not satisfy certain predefined conditions corresponding to the predefined parameters. In some examples, the server 102 may route the learner user from one screen to another screen without altering any user privileges. In an example, the server 102 may allow the learner user to proceed from one screen to a next screen of the experiential course content 304 when a predefined condition is satisfied by transmitting GUI data representative of the next screen to the client device 106 of the learner user. The GUI data here may further include a parameter configured to cause the client device 106 to render the next screen following the current screen at the appropriate time (e.g., when a learner user selects to advance to the next screen, etc.).

In some examples, the set of parameters may define a set of performance metrics that correspond to the set of user privileges. In an example, the performance metrics may include a student's score on an assessment. In some examples, when the user achieves a score that satisfies a threshold defined by the set of parameters, the user may be provided access to another screen or another portion of the experiential course. In such examples, the server 102 may be configured to determine whether a performance metric of a learner user satisfies a performance criterion related to the set of user privileges. Accordingly, the server 102 may provide, based at least in part on the performance criterion of the learner user satisfying the set of performance metrics, access to a subsequent screen pursuant to the set of pathways (e.g., connections, links, routes, navigation guides, etc.).

In block 410, the server 102 may transmit, via a communication network, the experiential course content to a client device of a learner user. The client device of the learner user may be, for example, a second client device 106. In some examples, the server 102 may transmit, to the second client device 106 of the learner user, one or more course file(s) corresponding to the experiential course content 304. In such examples, the experiential course content may include the subsets of screens the content creator has selected (e.g., in block 406), or pointers that indicate or identify the subsets of screens as stored in the database 110 for subsequent retrieval (e.g., by the second client device 106 during execution of the experiential course content for the learner user). Accordingly, the one or more course file(s) may represent the set of screens corresponding to the experiential course content 304. In addition, the experiential course content 304 is configured to provide the screens and course components of the set of screens according to the set of parameters. In an illustrative example, the experiential course content 304 may be configured to provide the introduction portion of the experiential course content 304. In such examples, the experiential course content 304 may be configured to further provide, in accordance with the set of parameters, the pre-lab portion following the introduction portion; the lab experiment portion following the pre-lab portion; and the post-lab portion following the lab experiment portion.

Example Portions of an Experiential Course

Figure 5:
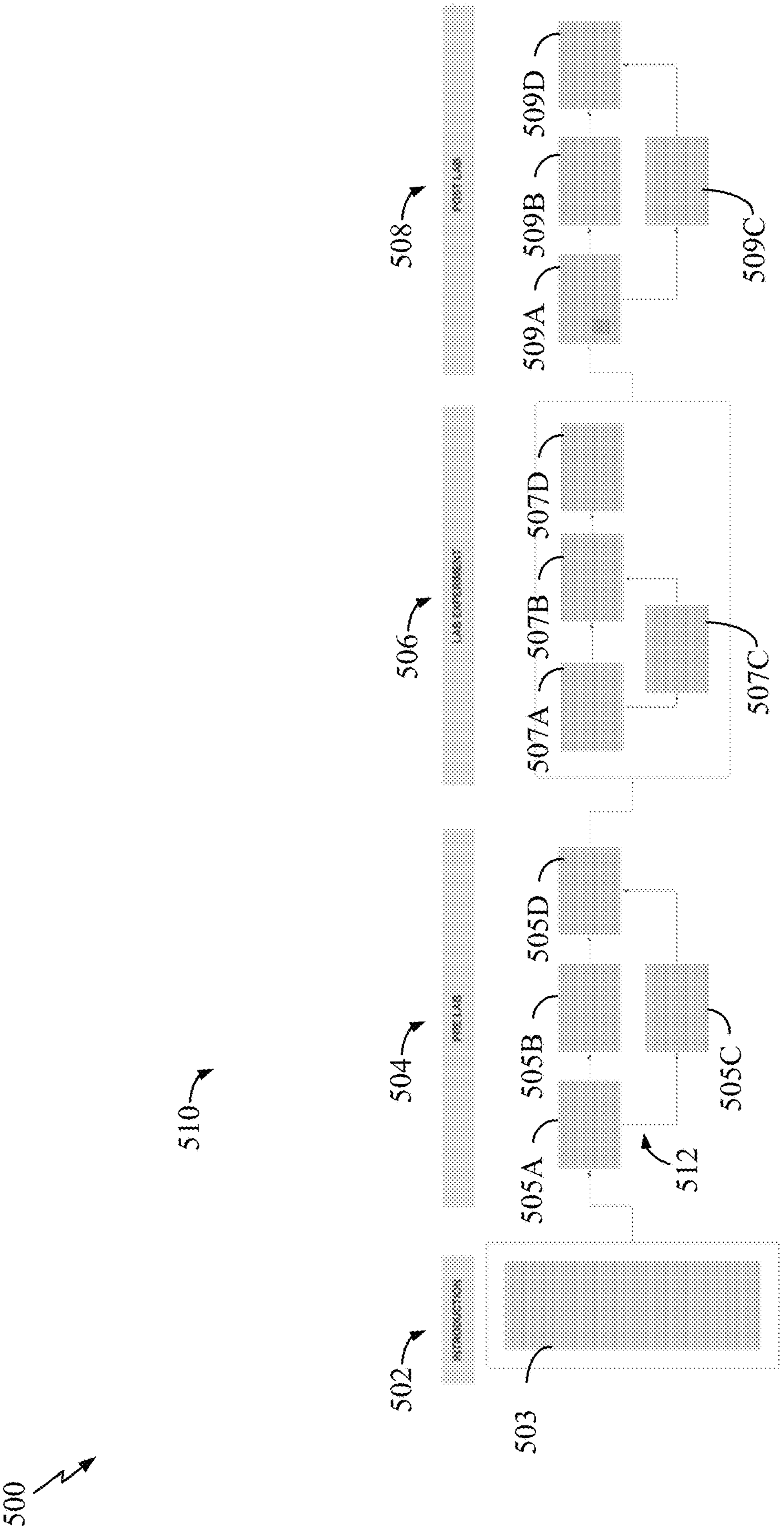
FIG. 5 is a schematic diagram conceptually illustrating example course portions of experiential course content configurable via the experiential course builder system of FIG. 3, in accordance with various aspects of the techniques described in this disclosure.

FIG. 5 is a schematic diagram 500 conceptually illustrating example course portions of experiential course content 304 configurable via the experiential course builder system 300 of FIG. 3 (e.g., using the process 400 of FIG. 4), in accordance with various aspects of the techniques described in this disclosure. In some examples, an experiential course, such as a lab course, may include a plurality of discrete course portions.

In an illustrative example, the experiential course content may include at least four discrete course portions (e.g., lab course sections). A first course portion may correspond to an introduction portion 502 of an experiential course. A second course portion may correspond to a pre-lab portion 504 of the experiential course. A third course portion may correspond to a lab experiment portion 506 of the experiential course. A fourth course portion may correspond to a post-lab portion 508 of the experiential course.

For the introduction portion 502, a content creator may select from a set of candidate screens, one or more introduction screens 503. In such examples, the server 102 may receive user selection of a set of introduction screens selected from a set of candidate introduction screens (e.g., as described with reference to block 406 of FIG. 4). The introduction screens, in some instances, may include links to external content that a content creator may define for the introduction portion 502. In addition, or alternatively, the server 102 may receive one or more parameters defining a pathway type to apply to the introduction portion 502. In an example, the server may receive, from a client device 106, user selection of a graph pathway type 512 for the introduction portion 502. In an example for the graph pathway type 512, the server 102 may receive one or more parameters to define a condition for navigating from screen 505A to screen 505B or to screen 505C.

For the pre-lab portion 504, a content creator may select pre-lab screens from a set of pre-lab screens 505A-D (e.g., as described with reference to block 406 of FIG. 4). In such examples, the server 102 may receive user selection of a set of pre-lab screens selected from a set of candidate pre-lab screens.

For the lab experiment portion 506, a content creator may select lab experiment screens from a set of lab experiment screens 507A-D (e.g., as described with reference to block 406 of FIG. 4). In such examples, the server 102 may receive user selection of a set of lab experiment screens selected from a set of candidate lab experiment screens. For the lab experiment portion 506, a content creator may define an experiment screen (e.g., experiment screen 507A) that allows a learner user to collect simulated experimental data.

For the post-lab portion 508, a content creator may select post-lab screens from a set of post-lab screens 509A-D (e.g., as described with reference to block 406 of FIG. 4). In such examples, the server 102 may receive user selection of a set of post-lab screens selected from a set of candidate post-lab screens.

With respect to the post-lab portion 508 of the experiential course, the learner users may graph and interpret the collected data. In an example, the learner users view collected data and answer questions about what the graphs and data show. Content creators (e.g., instructors, teacher's assistants, administrators, etc.) can customize post-lab assessments (e.g., quizzes, surveys, etc.) that the learner users may encounter while navigating the experiential course.

In an example, the server 102 may transmit, to a client device 106, the set of screens for each of the discrete course portions, including the introduction portion 502, the pre-lab portion 504, the lab experiment portion 506, and the post-lab portion 508. The server 102 may transmit the set of screens in accordance with the one or more predefined parameters, such as those described with reference to block 408 of FIG. 4, and/or described below, for example, with reference to FIGS. 7 through 14.

The example experiential course 510 illustrated in FIG. 5 is merely an example of an experiential course configuration (e.g., a course file representative of the screens and pathways between course portions and screens thereof). In some examples, the server 102 may receive, as the user selection of screens in block 406 of FIG. 4, any number of screen selections for any given course portion of the experiential course 510.

In addition, the pathway type 512 is merely an illustrative example of a graph pathway type where a first screen may include a branch node that can be configured to navigate a learner user to multiple different screens (e.g., the second screen 505B or the third screen 505C). Here, the server 102 may store the selection of screens as corresponding to the graph pathway type for the selection of screens. In some examples, a content creator may select a pathway type of a different type for defining a subset of screens for a given course portion. For example, for each discrete course portion, as part of block 406 of FIG. 4, the GUI may present different pathway types (e.g., as a list) and may receive a user selection of a particular pathway type for each course portion.

In an example, the server 102 may receive user selection of a set of screens for the pre-lab portion 504. The content creator may select for this set of screens, via the GUI, a pathway type selected from the group of a linear pathway type, a free pathway type, a hub-and-spoke pathway type, and the graph pathway type. For a linear pathway type, the server 102 may receive one or more parameters defining a pathway from, for example, a first screen 505B to a second screen 505D, rather than the first screen 505B branching to multiple screens. For a free pathway type, the server 102 receive one or more parameters defining a pathway from a first screen 505A to any other of the screens 505B, 505C, or 505D, and during execution, allow a learner user to navigate freely without restrictions between various portions or screens corresponding to a free pathway type. For a graph pathway type, the server 102 may receive one or more parameters defining multiple pathways from a first screen 505A to respective other screens (e.g., the screen 505B and 505C), and to define conditions for each pathway that, when satisfied, trigger a learner user to navigate from a first screen 505A to either the screen 505B or the screen 505C.

In some examples, each discrete course portion of the experiential course content 304 (e.g., the experiential course content 304 defining the example experiential course 510) may be associated with a particular pathway type. In an example, the introduction portion 502 may be associated with a first pathway type (e.g., a linear pathway type), the pre-lab portion 504 may be associated with a second pathway type (e.g., a graph pathway type), the lab experiment portion 506 may be associated with a third pathway type (e.g., a free pathway type), and the post-lab portion 508 may be associated with a fourth pathway type (e.g., a graph pathway type).

While illustrated in the example of FIG. 5 as including a single direction of flow (e.g., from left to right), the techniques of this disclosure are not so limited. The server 102 may receive, from the client device 106 of the content creator, one or more parameters (e.g., conditions) configured to define a pathway from any screen of the experiential course 510 to any other screen of the experiential course 510. In an example, the one or more parameters may define a pathway from screen 507D to screen 507A, to screen 507C, to screen 505C, etc. when a particular condition is satisfied (e.g., as described with reference to FIG. 8-14). Example conditions may be that a learner user does not achieve a predefined threshold score on an assessment, a learner user incorrectly obtains a particular set of lab experiment data in the lab experiment portion 506, a learner user selects a particular button, such as a back button, or one or more help buttons).

The content creator may define any such parameters, via the GUI, where the server 102 may then impose navigation controls through the selected set of screens of the experiential course 510. In this way, the server 102 may be configured to control user navigation through the experiential course content 304 of an example experiential course 510 based on one or more user parameters (e.g., from the set of parameters) that define the pathway.

User Selection of Screens

FIG. 6 is a diagram conceptually illustrating example experiential course content screens accessible via the experiential course builder system 300 of FIG. 3, in accordance with various aspects of the techniques described in this disclosure. In some examples, the experiential course builder system 300 may generate graphical user interface (GUI) data for an example library of candidate screens configured to be provided via a GUI. The example screen library may include a set of candidate screens. In an example, the server 102 can be configured to access, from an experiential course content database 110, candidate screen data representative of the set of candidate screens (e.g., see block 402 of FIG. 4).

The server 102 may provide the candidate screen data as part of the GUI data (e.g., see block 404 of FIG. 4), which may include a library of candidate screens 600, including a set of candidate introduction screens, a set of candidate pre-lab screens, a set of candidate lab experiment screens, and a set of post-lab experiment screens. The client device 106 may display the library of candidates screens 600 as part of the GUI on a display of the client device 106. Accordingly, the server 102 may receive user selection of a set of screens from the library of candidate screens 600, as described with reference to block 406 of FIG. 4. That is, FIG. 6 illustrates an example of a rendering of GUI data configured to elicit user selection of a selection of screens. In an example, the user selection may include a selection of screens 312 to create, for example, the experiential course 510 illustrated in FIG. 5. The server 102 may utilize the selection of screens to configure the experiential course content 304 defining an experiential course.

In an illustrative example, the server 102 may access a first set of candidate screens for configuring an introduction portion of an experiential course (e.g., see block 402 of FIG. 4). In an example, the server 102 may access candidate screen data representative of the first set of candidate screens. In some examples, the server 102 may transmit the first set of candidate screens to a client device 106 of a content creator. In an example, the server 102 may transmit GUI data to the client device 106 where the GUI data includes the candidate screen data representative of the first set of candidate screens (e.g., see block 404 of FIG. 4). In such examples, the client device 106 (e.g., processing circuit 204 of the client device 106) may render, based on the candidate screen data, the library 600 of candidate screens on a display of the client device 106 (e.g., on a display of a mobile device, a laptop, a tablet, etc.), as shown in FIG. 6.

The library 600 of candidate screens may include a default set of screens for a particular course portion of an experiential course (e.g., introduction portion, pre-lab portion, lab experiment portion, post-lab portion), for an entire experiential course (e.g., all course portions of the experiential course), or for a particular screen within a discrete course portion. In such examples, a content creator may select, via the GUI, a screen template category (e.g., a first screen template category 604) from a set of screen categories 602. The server, in response, may provide the GUI data including candidate screen data with candidate screens that are within or associated with the screen template category that was selected, and such candidate screens may be displayed on the display of the client device 106 as the library 600 of candidate screens.

To execute the screen selection process (e.g., block 406 of FIG. 4), a content creator may iteratively navigate to the library 600 of candidate screens to add screens to each section, for example, by selecting an add screen button from a GUI illustrating the course (see, e.g., FIG. 7) or a portion thereof (e.g., FIGS. 8-14). In some examples, a template (e.g., for a particular course or portion thereof) may include a pathway type for a particular course portion (or each course portion), and may include default pathways between selected screens. Whether candidate screens are added individually, in groups, or as part of a selected template, the client device 106 may then receive parameters (e.g., in block 408 of FIG. 4) that further define the particular screens selected, the pathways connecting the screens selected, and the conditions enabling the client device 106 to advance along the pathways.

In some examples, a content creator may select various screens for inclusion in an experiential course for various portions (e.g., experiential course sections). Accordingly, the server 102 may receive the user selection of the set of screens for the discrete portions of the experiential course.

Experiential Course Content Parameter Settings

Figure 7:
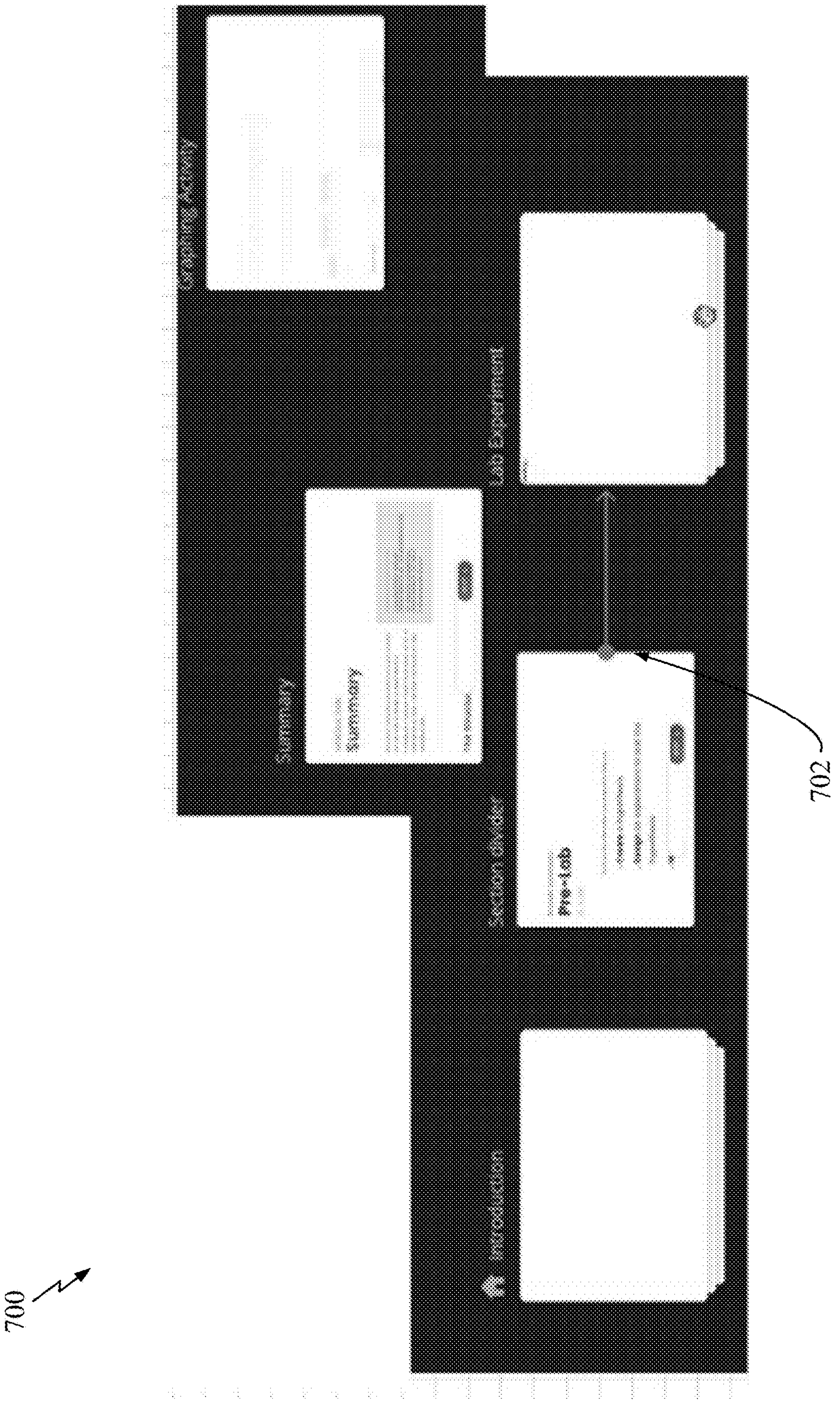
FIG. 7 is a diagram conceptually illustrating an example GUI screen for defining example parameters for experiential course content, in accordance with various aspects of the techniques described in this disclosure.

FIG. 7 is a diagram conceptually illustrating an example GUI screen 700 for defining example parameters relative to experiential course content 300 for an experiential course, in accordance with various aspects of the techniques described in this disclosure. For example, the server 102 may receive, from the client device 106 of the content creator, a set of parameters defining a set of pathways (e.g., see block 408 of FIG. 4). The GUI screen 700 may allow a content creator (e.g., an administrator, teacher, etc.) to define, via a set of parameters, the set of pathways between various screens of an experiential course. In an example, a content creator may define a flow from one screen or portion of a course to another screen or another portion of the course. In such examples, a server 102 may receive one or more parameters defining a pathway through the experiential course content. In some examples, the pathway 702 may be subject to certain scenarios defined by the one or more parameters. In an example, the pathway 702 may include a condition that, when satisfied, routes a learner user from one portion of an experiential course to a next portion of the experiential course or in some examples, to a prior portion of the experiential course.

Figure 8:
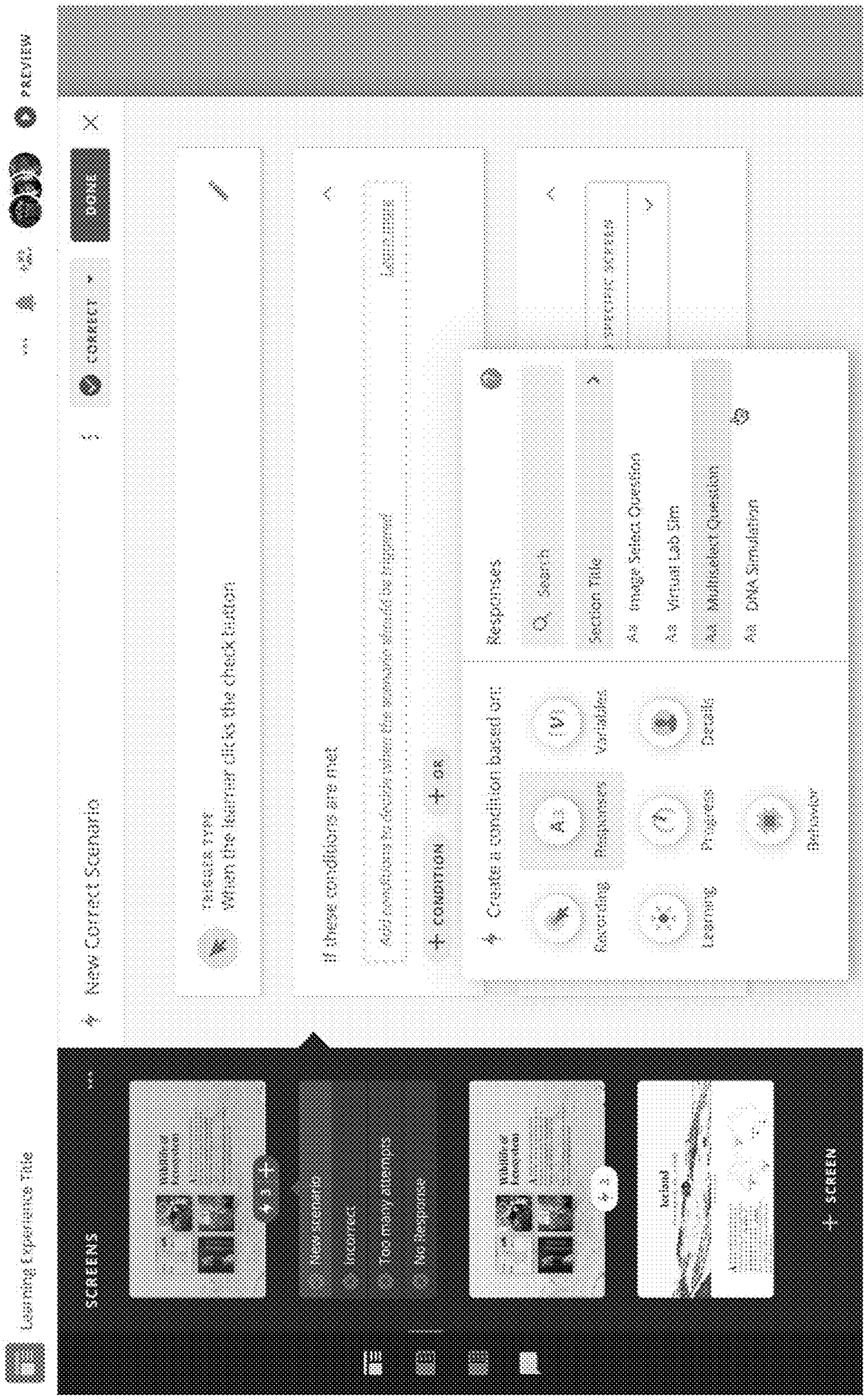
FIG. 8 is a diagram conceptually illustrating an example GUI screen for configuring scenarios via the experiential course builder system, in accordance with various aspects of the techniques described in this disclosure.
Figure 9:
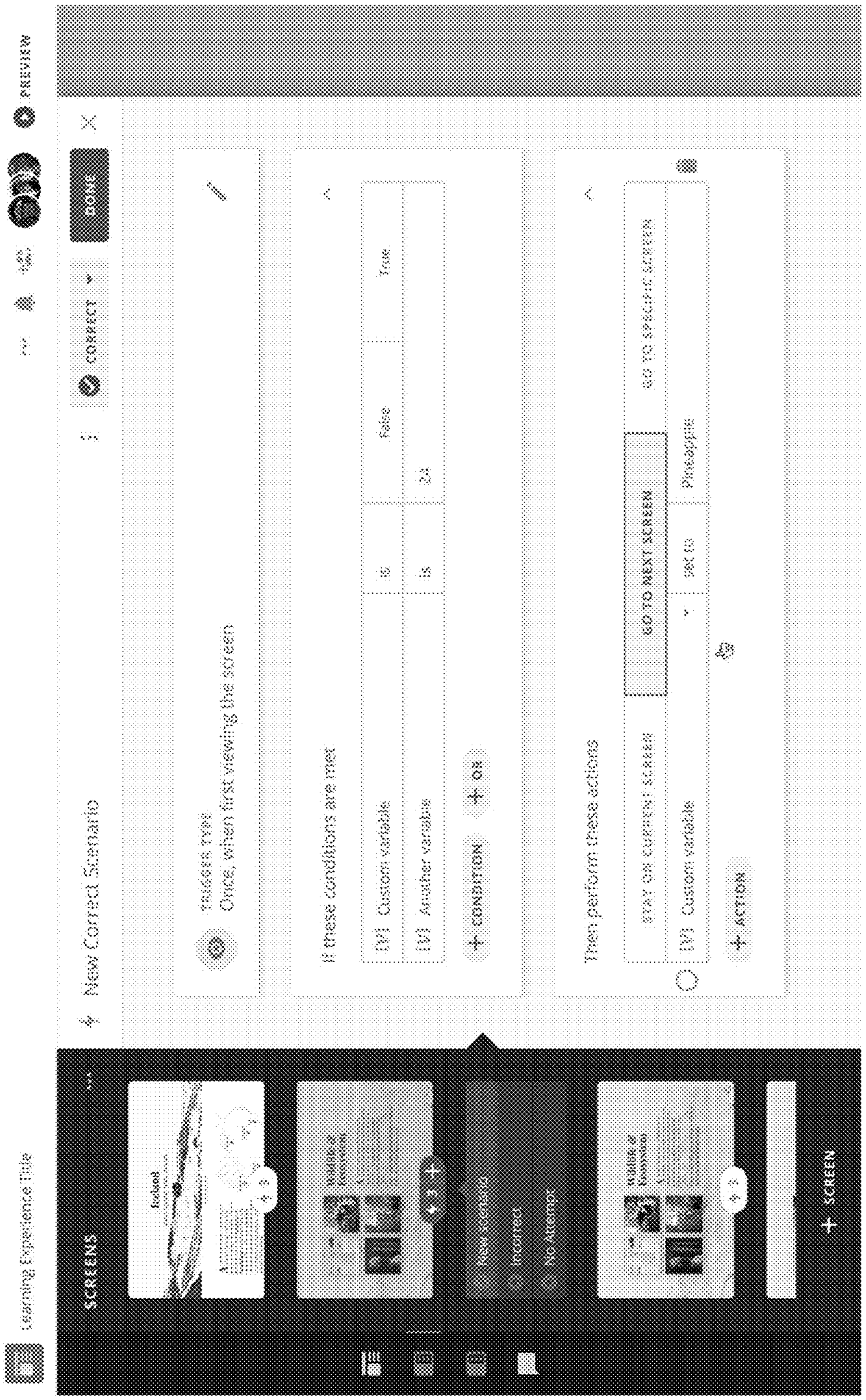
FIG. 9 is a diagram conceptually illustrating an example GUI screen for configuring scenarios via the experiential course builder system, in accordance with various aspects of the techniques described in this disclosure.
Figure 10:
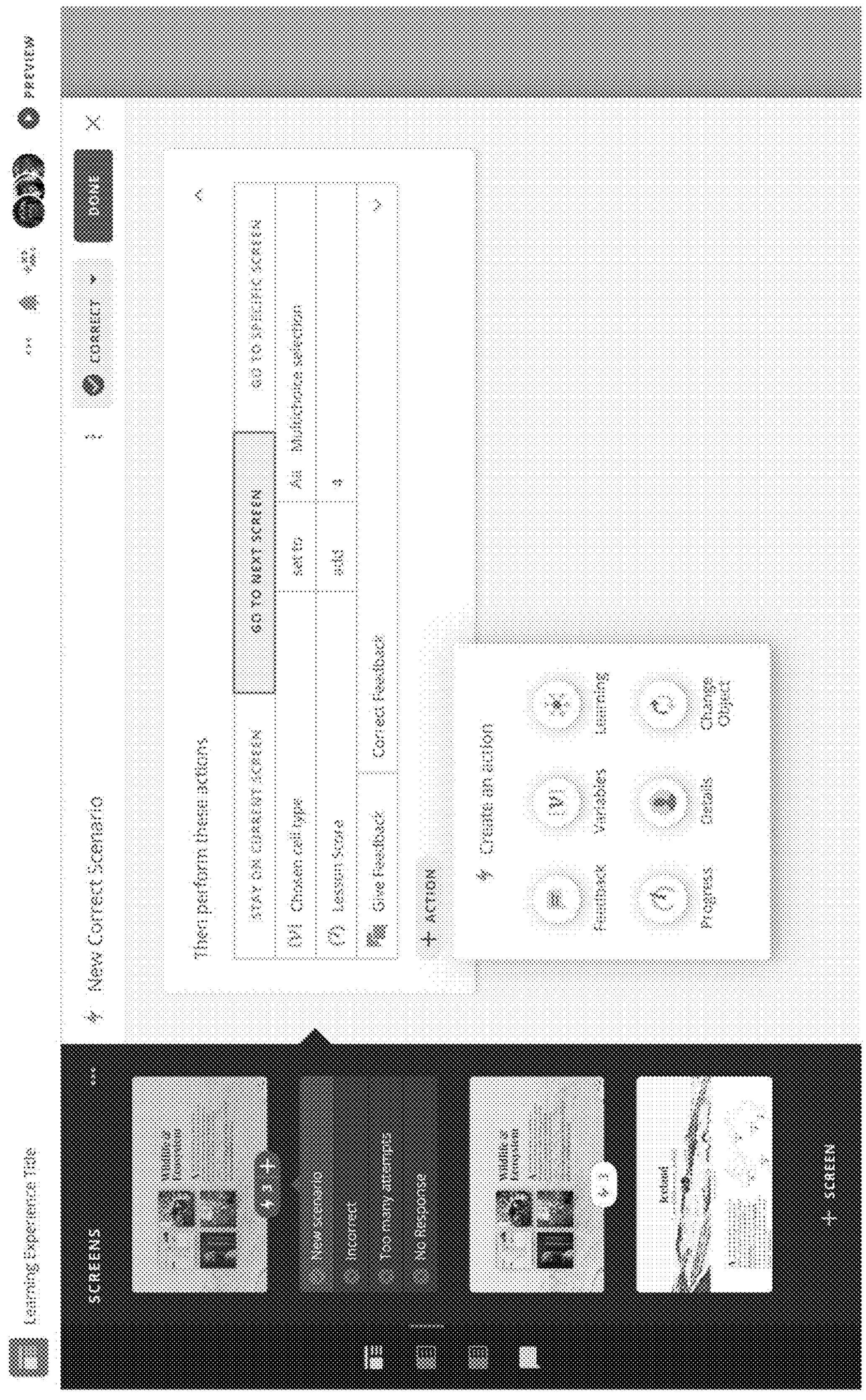
FIG. 10 is a diagram conceptually illustrating an example GUI screen for configuring scenarios via the experiential course builder system, in accordance with various aspects of the techniques described in this disclosure.

FIG. 8 is a diagram conceptually illustrating an example GUI screen 800 for defining conditions via the experiential course builder system 300 for an example scenario, in accordance with various aspects of the techniques described in this disclosure. In an example, a content creator may define one or more parameters for a scenario. In such examples, the server 102 may receive, from the client device 106 of the content creator, a set of parameters (e.g., see block 408 of FIG. 4) defining one or more scenarios for navigating the experiential course content 304. A scenario may include a condition that, when satisfied, causes an action to occur. Accordingly, defining a scenario (e.g., by defining one or more parameters as part of block 408 of FIG. 4) may include both defining the condition(s) of the scenario and the corresponding action(s) of the scenario. In an example, a content creator may define a scenario for allowing a learner user to progress from one portion of an experiential course to another portion.

The GUI screen 800 may generally be part of a course builder interface of the GUI enabling the client device 106, based on user input, to indicate to the server 102 to add, modify, and/or remove experiential course content and/or scenarios to a screen of an experiential course (e.g., a lab). In some examples, the server 102 may generate a GUI screen 800 (e.g., by providing GUI data to the client device 106 that causes the GUI to be rendered on a display of the client device 106) that provides a list of condition types for the content creator to select as user input. The GUI screen 800 may be generated by the server 102 in response to receiving of a user indication to add a scenario to the screen of the experiential course. The server 102 may present the list of condition types on the GUI screen 800 in response to receiving an indication to add a condition (e.g., by selecting a soft "+ condition" button on the GUI screen 800). The list of conditions types may include conditions based on progress, behavior, responses, etc.

In some examples, the set of scenarios may include at least one scenario that has been predefined in the database. In such examples, the at least one predefined scenario may be selectable, from the database, as a template scenario to apply to one or more screens of the experiential course content. In another example, the server 102 may receive one or more parameter settings for defining a scenario. In addition, or alternatively, the scenario may be stored in a database 110.

In some examples, a content creator may specify, via the GUI, one or more parameters for defining a set of pathways to connect the various screens of the experiential course content for user navigation through the experiential course content (see, e.g., block 408 of FIG. 4). In an example, a content creator may specify, via the one or more parameters, a set of pathways that include pathways of different types. In an example, the set of pathways may include any one or more of: a free pathway type, a graph pathway type, or a linear pathway type. A free pathway type may allow a learner user to navigate through a specified set of screens without restriction or conditions metering the learner user's flow through the experiential course. A linear pathway type may allow a learner user to navigate in a specified order through a set of screens. A graph pathway type may include one or more specified conditions that, when satisfied, cause the server to automatically route the learner user to a specified screen of the experiential course in accordance with the particular condition that has been satisfied.

In some examples, the server 102 may receive, from the at least one client device, indication of a user interaction related to a specific screen (e.g., a particular activity screen, etc.). In such examples, the server 102 may determine, from the indication, whether a condition, defined by the set of one or more parameters, is satisfied. In some examples, the condition, when satisfied, may be configured to cause the server 102 to provide privileges for the learner user to continue pursuant to the first path following the activity screen, or provide a remediation pathway, defined via a subset of the set of parameters, for the learner user to follow pursuant to the set of pathways, the remediation pathway including a remediation path from the activity screen to a remediation screen of the experiential course content. In some examples, the remediation screen may include a portion of an electronic text (e-text) defined via the set of parameters.

In some examples, the server 102 may receive user input including scenario definition information for at least one scenario to apply for the experiential course. In some examples, the server 102 may elicit scenario definition information. In such examples, the scenario definition information may include conditions and/or actions the server 102 may monitor and/or perform to apply a given scenario to the experiential course.

In some examples, the server 102 may receive the user input selecting a condition type for the scenario (e.g., via selection of a condition on the list of condition types). In an example, the server 102 may specify the condition is based on a learner user's response to questions and/or interactive elements in the experiential course. In such examples, the server 102 may receive the user input selecting a particular condition for the scenario. In an example, the server 102 may specify the condition is based on a learner user's response to multiselect questions.

In addition, or alternatively, the server 102 may generate a GUI screen to elicit user input regarding an action. In an example, the GUI screen may resemble the GUI screen 900 of FIG. 9. In such examples, the scenario definition information may include an action, such as an action for the server 102 to take when the condition is satisfied. In an example, the scenario definition information may include an action to advance to a particular screen, such as the next screen in a set of screens. Accordingly, in such examples, the scenario definition information may both define a pathway between screens (e.g., from the current screen to the particular screen specified) and a condition for that pathway (e.g., the condition evaluated to determine whether to proceed to the particular screen specified). Accordingly, defining a scenario, as described herein, may be utilized to define one or more parameters (e.g., pathway information, scenario (e.g., condition) definition information, etc.) as described above for example, with reference to block 408 of FIG. 4.

In some examples, the server 102 may receive user input defining an action for the scenario. The server 102 may generate a GUI screen to elicit user input regarding the action. The GUI screen may resemble the GUI screen 1000 of FIG. 10. In an illustrative example, the action may include action to change a component (e.g., an object, text, etc.) on a lab experiment screen. In an example, a particular condition of the scenario may trigger a content component on a screen, such as an audio player, to change to another content component, such as a video player. In another illustrative example, the action may include the server 102 providing feedback for a lab experiment screen via the client device, e.g., in the form of text on the lesson screen, audio, or video. In some examples, a particular scenario definition may include a condition associated with multiple actions (e.g., that the server 102 executes when the condition is satisfied), multiple conditions (e.g., logically OR-ed or AND-ed together) that are associated with one action, or multiple conditions that are associated with multiple actions.

Configuring the Lab Experiment Portion of the Experiential Course Content

Figure 11:
FIG. 11 is a diagram conceptually illustrating an example GUI screen for configuring an animation simulation for a lab experiment portion of the experiential course content, in accordance with various aspects of the techniques described in this disclosure.

FIG. 11 is a diagram conceptually illustrating an example GUI screen 1100 for configuring an animated simulation for a lab experiment portion of the experiential course content, in accordance with various aspects of the techniques described in this disclosure. In some examples, the GUI screen 1100 may represent a display of the animated simulation for a lab experiment portion 506 of the experiential course content 304. In an example, an interactive animation may correspond to a particular portion of the experiential course content 304, such as a lab experiment portion 506 of experiential course content 304.

In some examples, the lab experiment portion may include one or more animations 1102. The animations may be configured to simulate an environment in which a learner user conducts the lab experiment portion of the experiential course content, the simulation of the lab experiment portion defined, at least in part, via the set of parameters (e.g., received as part of block 408 of FIG. 4). A content creator may add components to the simulation, such as the component 1104 shown as a hand, as only an example. The server 102 may provide a library of components, such as component 1104, for a content creator to select from to include on any particular screen (e.g., screens 507A-507C described with reference to FIG. 5) of the lab experiment portion 506. Accordingly, the animation 1102 may correspond to one screen of the lab experiment portion 506, where a learner user can manipulate components 1104 of the experiential course content on the screen.

In an example, a content creator may configure parameters of the animated simulation (e.g., as described with reference to block 408 of FIG. 4). In an example, the content creator may configure steps for navigating the simulation. In such examples, the server 102 may receive one or more parameters defining steps for a learner user to follow to navigate a simulation during the lab experiment portion 506. In some examples, the candidate screen data for certain lab experiment screens may include a set of configurable parameters for the lab experiment screen. In an example, a configurable parameter may include a number of steps for a lab experiment and/or text, audio, or visual components that correspond to each step of the lab experiment.

Figure 12:
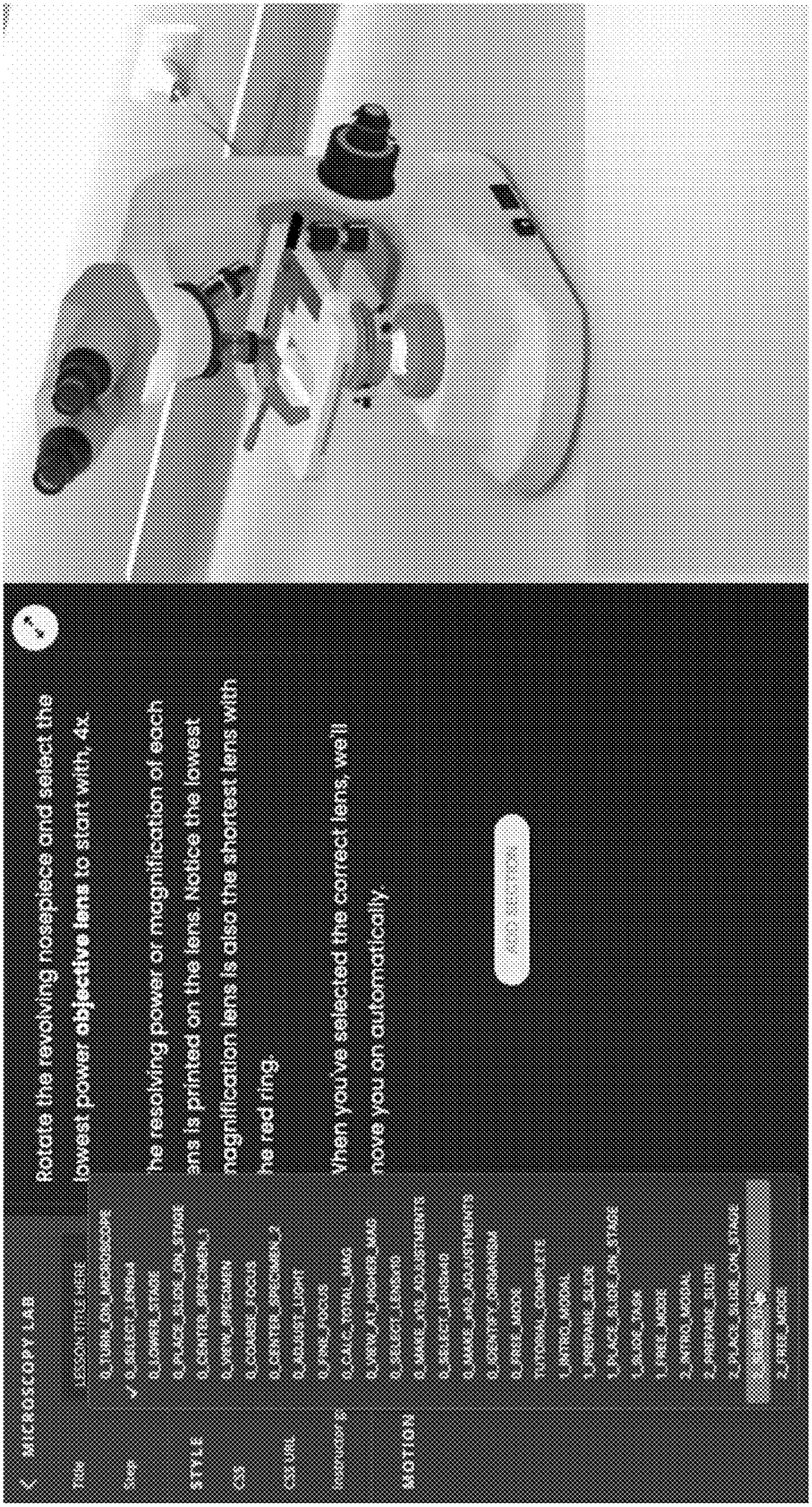
FIG. 12 is a diagram conceptually illustrating an example GUI screen for configuring procedural components for a lab experiment portion of the experiential course content, in accordance with various aspects of the techniques described in this disclosure.

FIG. 12 is a diagram conceptually illustrating an example GUI screen 1200 for configuring procedural components for a lab experiment portion of the experiential course content, in accordance with various aspects of the techniques described in this disclosure. A server 102 may receive, from a client device 106 via GUI screen 1200, a selection of components (e.g., sections, text, steps, animation items, etc.) to include as part of a screen of the lab experiment portion. This selection of components may be part of the parameters received in block 408 of FIG. 4.

Figure 13:
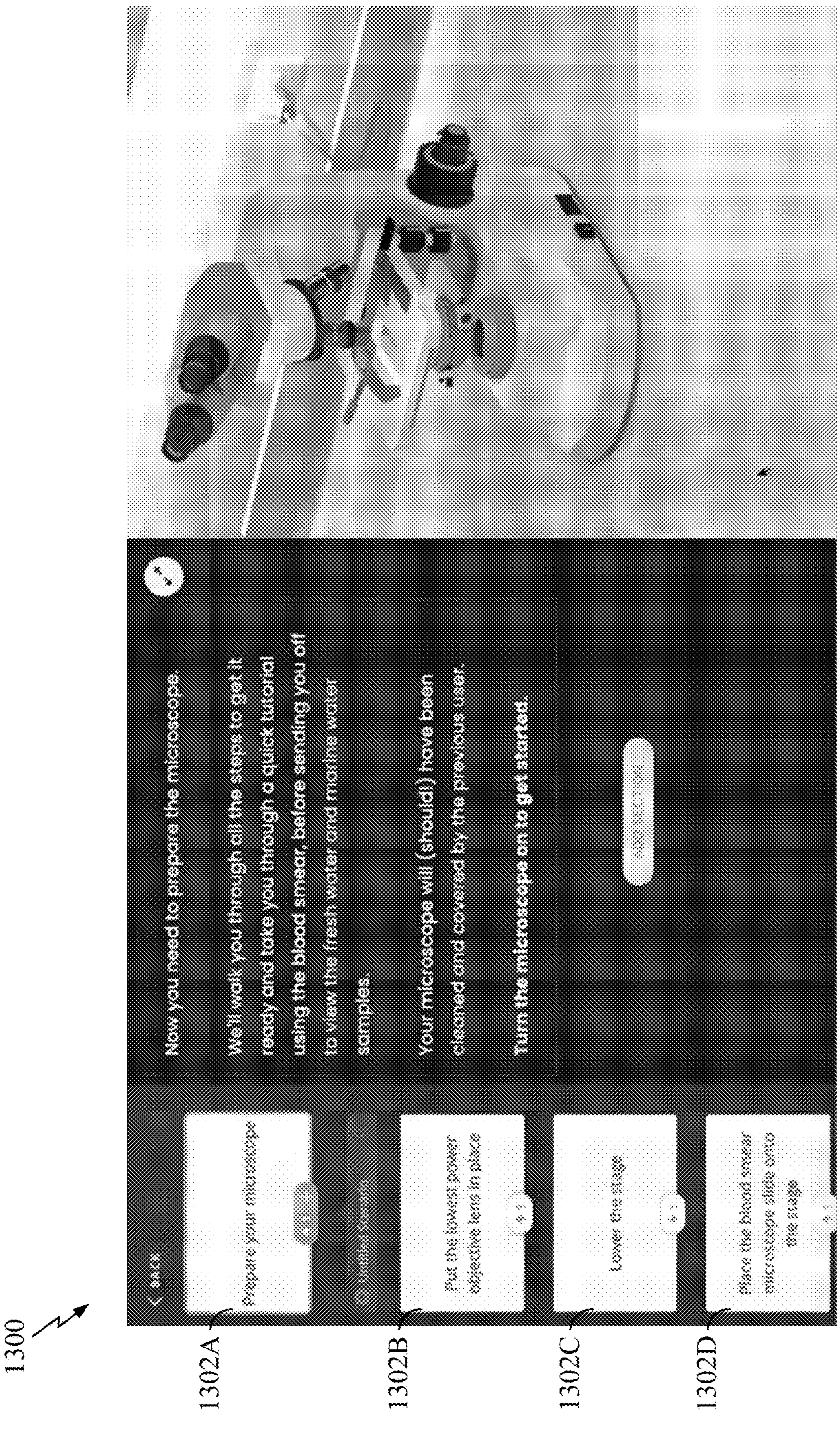
FIG. 13 is a diagram conceptually illustrating an example GUI screen for configuring lab experiment screens for a lab experiment portion of the experiential course content, in accordance with various aspects of the techniques described in this disclosure.

FIG. 13 is a diagram conceptually illustrating an example GUI screen 1300 for configuring lab experiment screens for a lab experiment portion of the experiential course content, in accordance with various aspects of the techniques described in this disclosure. The lab experiment portion may include a number of lab experiment screens (e.g., one of screens 1302A-D as an example). As described with reference to block 406 of FIG. 4, a content creator may select from candidate lab experiment screens (e.g., from screen library 600) to configure the lab experiment portion of the experiential course by providing a selection of screens for the lab experiment portion of the course. The server 102 may receive the user selection, including the selection of lab experiment screens from a set of candidate lab experiment screens. The content creator, via the client device 106, may further configure these screens for the lab experiment portion by selecting one of the screens and then providing a set of parameters (e.g., using the GUI screen 1200 of FIG. 12 as part of block 408 of FIG. 4) to the server 102. The GUI screen 1300 includes three display sections including a screen navigator panel (on the left side) enabling a content creator to select a screen of the lap experiment portion, a lab instruction or process panel (in the middle), and an simulation panel (on the right side). By selecting a screen on the screen navigation panel, the client device 106 displays the lab instruction or process panel associated with the selected screen and the simulation panel associated with the selected screen. The lab instruction or process panel provides information and/or instruction about the simulation illustrated in the simulation panel. The GUI data used to populate the GUI screen 1300, like other GUI screens described herein, may be provided by the server 102 to the client device 106 (e.g., in response to content creator selections and configurations input via the GUI screens and provided to the server 102).

Figure 14:
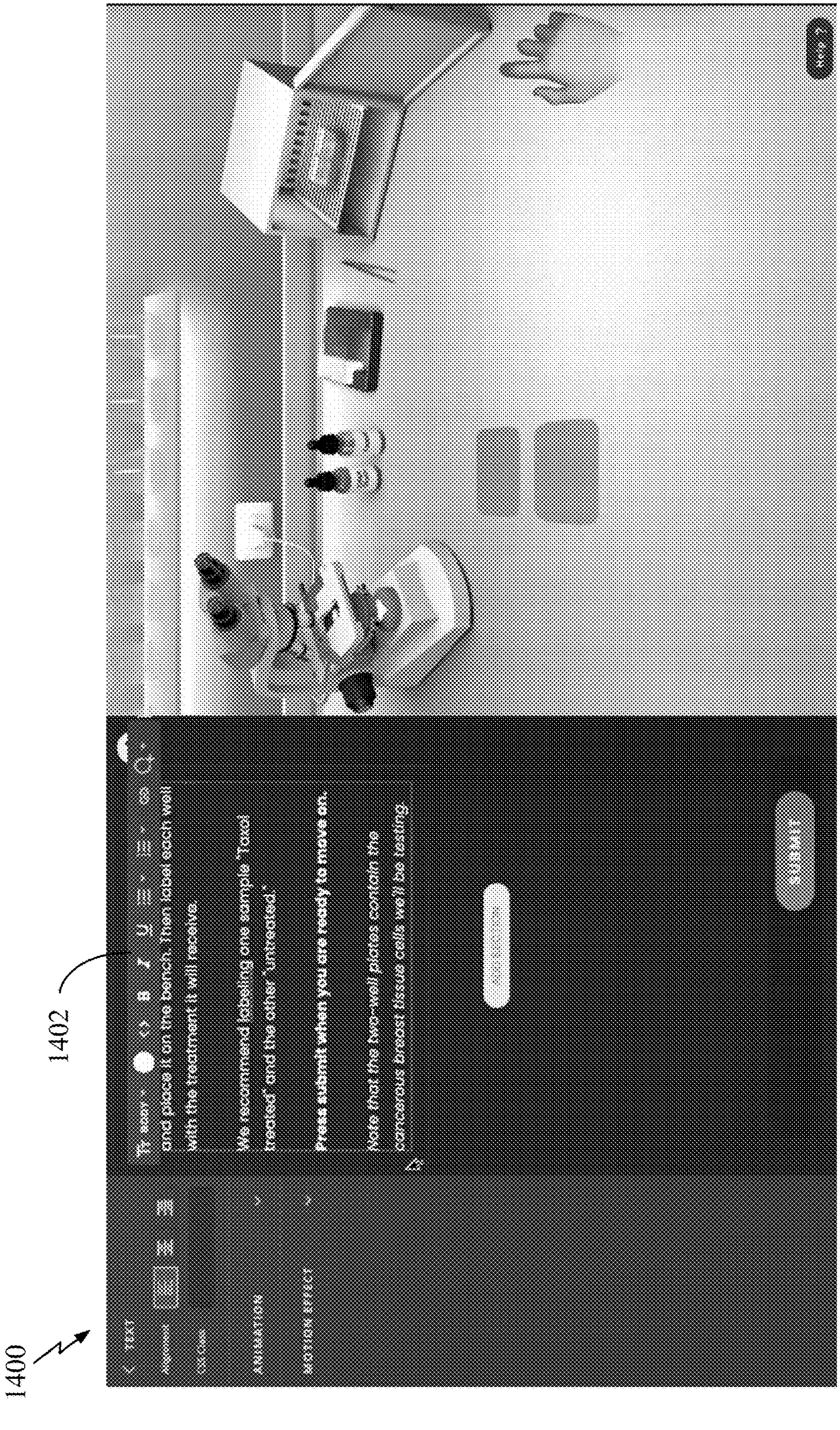
FIG. 14 is a diagram conceptually illustrating an example GUI screen for configuring course components for an example lab experiment screen, in accordance with various aspects of the techniques described in this disclosure.

FIG. 14 is a diagram conceptually illustrating an example GUI screen 1400 for configuring course components for an example lab experiment screen, in accordance with various aspects of the techniques described in this disclosure. In some examples, a screen of a particular course portion may include template (e.g., default) components, such as default text. A content creator may manipulate such components, for example, utilizing a text editor 1402, in an example. In addition, a content creator may define animations, motion effects, and any other configurable components of a given screen. The server 102 may receive, from the client device 106 via the GUI screen 1400, the configuration of course components as part of the one or more parameters (e.g., described with reference to block 408 of FIG. 4).

Altering Course Content

In some examples, the server 102 can be configured to allow certain users to view the current state of another user's screen. In an example, a first learner user may view the current state of a second learner user's screen as the second learner user navigates the experiential course content. In another example, a content creator (e.g., a teacher) may view a current state of a learner user's screen as the learner user navigates the experiential course content.

In an example, a learner user may be currently at a particular screen of the lab experiment portion 506, where the learner user may be collecting data and utilizing a simulated lab bench (e.g., as shown being configured by a content creator in FIG. 11). In such examples, a simulated lab bench may represent an example course component 314 for an example experiential course, such as for an experiential course created via the process 400 of FIG. 4.

In some examples, a first user may view a current state of the simulation. In an example, the server 102 can be configured to provide the first user with a rendering of a screen showing a current state of where a learner user is while the learner user navigates the experiential course content. In this way, the server 102 may allow the first user to view where the student is in the simulation or otherwise how the student is progressing through the experiential course.

In an illustrative example, the server 102 may receive, from a first client device 106 (e.g., corresponding to a course content creator), a request to observe a progress state related to the at least one client device of the learner user. In an example, the request may include a request to view a current state of the learner user's screen as the learner user is navigating the experiential course content. In such examples, the server 102 may determine whether the course content creator has sufficient privileges to observe the progress state of the learner user. If so, the server 102 may transmit, to the first client device of the content creator, a rendering of the progress state of the learner user.

In some examples, the server 102 may receive a request from the first user to alter the experiential course content 304. In this way, the first user may request an alteration as to how the server 102 routes a learner user through the experiential course content. In an illustrative example, the server 102 may receive, from the first client device, an alteration to the experiential course content. In such examples, the server 102 may transmit, to the first client device 106, a second rendering of the progress state of the learner user following an implementation of the alteration to the experiential course content. In some examples, the alteration includes a remedial change to the set of pathways. In such examples, the server 102 may receive, from the first client device 106, the remedial change. The server 102 may then update the set of pathways pursuant to the remedial change. In some examples, the remedial change may include a change to a course component 314 for a particular screen 312. In an example, the remedial change may include an alteration to a text box component of a particular screen 312. In such examples, the remedial change can allow a content creator to focus the learner user on what the content creator wants the learner user to focus on to assist the user with navigating the experiential course content 304.

Machine Learning

A trained machine learning (ML) model and/or artificial intelligence (AI) algorithms can be utilized to process and analyze the user interactions with the experiential course builder system 300 in accordance with certain examples of this disclosure where ML models are considered advantageous (e.g., predictive modeling, inference detection, contextual matching, natural language processing, etc.). Examples of ML models that may be utilized with aspects of this disclosure include classifiers and non-classification ML models, artificial neural networks ("NNs"), linear regression models, logistic regression models, decision trees, support vector machines ("SVM"), Naïve or a non-Naïve Bayes network, k-nearest neighbors ("KNN") models, k-means models, clustering models, random forest models, or any combination thereof. These models may be trained based on data indicating how users interact with the experiential course builder system 300. In an example, certain aspects of the disclosure will be described using events or behaviors (such as clicking, viewing, or watching) with respect to items (e.g., component questions from a question bank, etc.), for purposes of illustration only. In an example, a user may score the results of content bank (e.g., a question bank, etc.) automated selection, which may be utilized to train an ML model for future experiential courses. This helpful data may be shared across a communication network so that optimal results may be presented to more than one user based on similar experiential course content interactions. In an illustrative example, the server 102 may utilize ML models and/or AI algorithms to automatically determine certain experiential course content for one or more portions of the experiential course. For brevity, these aspects may not be described with respect to events or behaviors regarding objects (e.g., data objects, such as search strings).

In some examples, the systems and methods described herein (e.g., the experiential course builder system 300, the method 400, etc.) enable an efficient technique for managing experiential course content 304 for an experiential course such that the system may efficiently store experiential course content 304 (e.g., course screens of an experiential course). Such networked control of experiential course content 304 provides an improved content management system at least in that additional electronic resources (e.g., experiential courses) are able to be created by remotely-located client devices 106, shared among these client devices 106, and tailored to specific experiential courses having different experiential course content 304 for various experiential courses, thereby improving the electronic organization and distribution of the experiential course content. The experiential course builder 300 may further improve the user interface on a client device by preventing the display of undesired or irrelevant experiential course content 304 (preventing a cluttered display) relative to a particular portion of the experiential course, and providing the display of desired or relevant experiential course content 304, in light of a current portion of the experiential course a user is configuring via the GUI of the experiential course builder system 300 at the time. In addition, the systems and methods enable the creation, sharing, and displaying of desired or relevant experiential course content 304 associated with an experiential course in real-time (e.g., seemingly instantaneous, immediate but for network-related communication delays, within a few seconds).

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

What is claimed is:

1. A computing system for managing learning content, the system comprising:
- a database configured to store:
  - experiential course content, the experiential course content comprising a plurality of discrete course portions, and
  - candidate screen data, the candidate screen data including:
    - a plurality of candidate screens including: a set of candidate introduction screens, a set of candidate pre-lab screens, a set of candidate lab experiment screens, and a set of candidate post-lab screens; and
- one or more processors coupled to the database, the one or more processors, in coordination with the database, configured to:
  - access the database to obtain the candidate screen data;
  - provide, to a user device of a content creator, graphical user interface (GUI) data for display as part of a GUI on the user device, wherein the GUI data includes the candidate screen data, wherein the GUI data is configured to cause presentation of the plurality of candidate screens based on a corresponding discrete course portion for each respective candidate screen such that the GUI dynamically presents a separate corresponding set of candidate screens of the plurality of candidate screens for each discrete course portion of the plurality of course portions;
  - receive, from the user device via the GUI, user selection of a plurality of screens to be included in the experiential course content, including:
    - a subset of introduction screens selected from the set of candidate introduction screens, the subset of introduction screens forming an introduction portion of the experiential course content,
    - a subset of pre-lab screens selected from the set of candidate pre-lab screens, the subset of pre-lab screens forming a pre-lab portion of the experiential course content,
    - a subset of lab experiment screens selected from the set of candidate lab experiment screens, the subset of lab experiment screens forming a lab portion of the experiential course content, and
    - a subset of post-lab screens selected from the set of candidate post-lab screens, the subset of post-lab screens forming a post-lab portion of the experiential course content, wherein the introduction portion, the pre-lab portion, the lab portion, and the post-lab portion are discrete course portions of the experiential course content;
  - receive, from the user device via the GUI, user input including a set of parameters defining a set of pathways corresponding to the plurality of discrete course portions;
  - configure a simulated lab environment for the lab portion of the experiential course content, wherein the simulated lab environment is configured to be interactive with a learner user for conducting an experiment associated with the experiential course content;
  - configure steps to navigate the simulated lab environment for the experiment, wherein the simulated lab environment comprises an animated simulation of a lab bench;
  - transmit, via a communication network, the experiential course content to a client device of the learner user;
  - determine a progress state of the learner user in the simulated lab environment based on the learner user interacting with the simulated lab environment;
  - receive, from the user device, an alteration to the experiential course content;
  - dynamically alter the experiential course content based on the alteration; and
  - transmit, to the client device of the learner user, the altered experiential course content.

2. The system of claim 1, wherein the set of pathways comprise one or more of:
- a first pathway between a first plurality of screens of the subset of introduction screens;
- a second pathway between a second plurality of screens of the subset of pre-lab screens;
- a third pathway between a third plurality of screens of the subset of lab experiment screens; or
- a fourth pathway between a fourth plurality of screens of the subset of post-lab screens.

3. The system of claim 1, wherein the set of pathways comprise a first path configured to direct user navigation through the experiential course content.

4. The system of claim 1, wherein the set of parameters define a set of user privileges configured to control navigation through the experiential course content pursuant to the set of pathways.

5. The system of claim 1, wherein the one or more processors are configured to:
- transmit, to the user device, a rendering of a current progress state of the experiential course content for the learner user while the learner user interacts with the experiential course content.

6. The system of claim 1, wherein the alteration includes at least one of: a first remedial change to the set of pathways; or a second remedial change that corresponds to text book component of a present screen of the experiential course content presented to the learner user via the client device.

7. The system of claim 1, wherein the set of parameters includes a condition and a corresponding action, wherein the condition, when satisfied, results in the corresponding action.

8. The system of claim 7, wherein the condition is based on at least one of: a behavior of the learner user, a progress of the learner user through the experiential course content, or a response of the learner user to the experiential course content; and wherein the corresponding action controls navigation from a first portion of the experiential course content to a second portion of the experiential course content.

9. The system of claim 8, wherein the first portion of the experiential course content is a first screen of the plurality of screens and the second portion of the experiential course content is a second screen of the plurality of screens, wherein the first screen and the second screen are included in:

the same discrete course portion of the experiential course content, or different discrete course portions of the experiential course content.

10. The system of claim 1, wherein the one or more processors are configured to:

add components to the simulated lab environment, wherein the components are configured to be manipulated by the learner user during the experiment.

11. A method of managing learning content, the method comprising:

accessing, by a server, a database to obtain candidate screen data, the candidate screen data including a plurality of candidate screens including: a set of candidate introduction screens, a set of candidate pre-lab screens, a set of candidate post-lab experiment screens, and a set of candidate post-lab screens;

providing, to a user device of a content creator, graphical user interface (GUI) data for display as part of a GUI on the user device, the GUI data including the candidate screen data, wherein the GUI data is configured to cause presentation of the plurality of candidate screens based on a corresponding discrete course portion for each respective candidate screen such that the GUI dynamically presents a separate corresponding set of candidate screens of the plurality of candidate screens for each discrete course portion of a plurality of course portions of experiential course content;

receiving, from the user device via the GUI, user selection of a plurality of screens to be included in the experiential course content, including:

a subset of introduction screens selected from the set of candidate introduction screens, the subset of introduction screens forming an introduction portion of the experiential course content, a subset of pre-lab screens selected from the set of candidate pre-lab screens, the subset of pre-lab screens forming a pre-lab portion of the experiential course content, a subset of lab experiment screens selected from the set of candidate lab experiment screens, the subset of lab experiment screens forming a lab portion of the experiential course content, and a subset of post-lab screens selected from the set of candidate post-lab screens, the subset of post-lab screens forming a post-lab portion of the experiential course content, wherein the introduction portion, the pre-lab portion, the lab portion, and the post-lab portion are discrete course portions of the experiential course content;

receiving, from the user device via the GUI, user input including a set of parameters defining a set of pathways corresponding to the plurality of discrete course portions;

configuring a simulated lab environment for the lab portion of the experiential course content, wherein the simulated lab environment is configured to be interactive with a learner user for conducting an experiment associated with the experiential course content;

configuring steps to navigate the simulated lab environment for the experiment, wherein the simulated lab environment comprises an animated simulation of a lab bench;

transmitting, via a communication network, the experiential course content to a client device of the learner user;

determining a progress state of the learner user in the simulated lab environment based on the learner user interacting with the simulated lab environment;

receiving, from the user device, an alteration to the experiential course content;

dynamically altering the experiential course content based on the alteration; and transmitting, to the client device of the learner user, the altered experiential course content.

12. The method of claim 11, wherein the set of pathways comprise at least one of:

a first pathway between a first plurality of screens of the subset of introduction screens;

a second pathway between a second plurality of screens of the subset of pre-lab screens;

a third pathway between a third plurality of screens of the subset of lab experiment screens; or a fourth pathway between a fourth plurality of screens of the subset of post-lab screens.

13. The method of claim 11, further comprising:

receiving, from the user device via the GUI, a selection of a pathway type to apply to the subset of introduction screens for the introduction portion of the experiential course content;

receiving, from the user device via the GUI, a selection of a pathway type to apply to the subset of pre-lab screens for the pre-lab portion of the experiential course content;

receiving, from the user device via the GUI, a selection of a pathway type to apply to the subset of lab experiment screens for the lab portion of the experiential course content; and receiving, from the user device via the GUI, a selection of a pathway type to apply to the subset of post-lab screens for the post-lab portion of the experiential course content.

14. The method of claim 11, further comprising:

receiving, from the user device, a request to observe a progress state of the learner user;

determining whether the content creator has sufficient privileges to observe the progress state of the learner user; and transmitting, to the user device, a rendering of the progress state of the learner user.

15. The method of claim 14, further comprising:

transmitting, to the user device, a second rendering of the progress state of the learner user following an implementation of the alteration to the experiential course content.

16. A non-transitory computer-readable storage medium having stored thereon instructions that, when executed, cause one or more processors to:

access a database to obtain candidate screen data, the candidate screen data including a plurality of candidate screens including: a set of candidate introduction screens, a set of candidate pre-lab screens, a set of candidate lab experiment screens, and a set of candidate post-lab screens;

provide, to a user device, graphical user interface (GUI) data for display as part of a GUI on the user device, the GUI data including the candidate screen data, wherein the GUI data is configured to cause presentation of the plurality of candidate screens based on a corresponding discrete course portion for each respective candidate screen such that the GUI dynamically presents a separate corresponding set of candidate screens of the plurality of candidate screens for each discrete course portion of a plurality of course portions of experiential course content;

receive, from the user device via the GUI, user selection of a plurality of screens to be included in the experiential course content, including:

a subset of introduction screens selected from the set of candidate introduction screens, the subset of introduction screens forming an introduction portion of the experiential course content, a subset of pre-lab screens selected from the set of candidate pre-lab screens, the subset of pre-lab screens forming a pre-lab portion of the experiential course content, a subset of lab experiment screens selected from the set of candidate lab experiment screens, the subset of lab experiment screens forming a lab portion of the experiential course content, and a subset of post-lab screens selected from the set of candidate post-lab screens, the subset of post-lab screens forming a post-lab portion of the experiential course content, wherein the introduction portion, the pre-lab portion, the lab portion, and the post-lab portion are discrete course portions of the experiential course content;

receive, from the user device via the GUI, user input including a set of parameters defining a set of pathways corresponding to the plurality of discrete course portions;

configure a simulated lab environment for the lab portion of the experiential course content, wherein the simulated lab environment is configured to be interactive with a learner user for conducting an experiment associated with the experiential course content;

configure steps to navigate the simulated lab environment for the experiment, wherein the simulated lab environment comprises an animated simulation of a lab bench;

transmit, via a communication network, the experiential course content to a client device of the learner user;

determine a progress state of the learner user in the simulated lab environment based on the learner user interacting with the simulated lab environment;

receive, from the user device, an alteration to the experiential course content;

dynamically alter the experiential course content based on the alteration; and transmit, to the client device of the learner user, the altered experiential course content.

17. The non-transitory computer-readable storage medium of claim 16, wherein the one or more processors are further caused to:

determine, from the user input, one or more components to add to the plurality of screens to be included in the experiential course content, wherein the experiential course content represents a laboratory lesson of a laboratory course.

18. The non-transitory computer-readable storage medium of claim 16, wherein the set of pathways comprise at least one of:

a first pathway between a first plurality of screens of the subset of introduction screens;

a second pathway between a second plurality of screens of the subset of pre-lab screens;

a third pathway between a third plurality of screens of the subset of lab experiment screens; or a fourth pathway between a fourth plurality of screens of the subset of post-lab screens.

19. The non-transitory computer-readable storage medium of claim 16, wherein the one or more processors are further caused to:

receive, from the user device corresponding to a course content creator, a request to observe a progress state of the learner user;

determine whether the course content creator has sufficient privileges to observe the progress state of the learner user; and transmit, to the user device, a rendering of the progress state of the learner user.

* * * * *